United States Patent
Manabe

(10) Patent No.: US 8,160,383 B2
(45) Date of Patent: Apr. 17, 2012

(54) TONE CORRECTING APPARATUS PROVIDING IMPROVED TONE CORRECTION ON IMAGE

(75) Inventor: Yoshitsugu Manabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 863 days.

(21) Appl. No.: 12/199,229

(22) Filed: Aug. 27, 2008

(65) Prior Publication Data

US 2009/0060328 A1    Mar. 5, 2009

(30) Foreign Application Priority Data

Aug. 31, 2007 (JP) ............................... P2007-224984

(51) Int. Cl.
*G06K 9/00* (2006.01)
(52) U.S. Cl. .......... 382/274; 382/268; 345/589; 345/77; 348/34; 396/108; 396/164
(58) Field of Classification Search .................. None
See application file for complete search history.

(56) References Cited

U.S. PATENT DOCUMENTS

| | | | |
|---|---|---|---|
| 5,808,697 A * | 9/1998 | Fujimura et al. ............. | 348/672 |
| 6,023,533 A * | 2/2000 | Sano et al. .................... | 382/274 |
| 6,798,903 B2 | 9/2004 | Takaoka | |
| 6,868,179 B2 * | 3/2005 | Gruzdev et al. ............... | 382/167 |
| 6,873,742 B2 | 3/2005 | Schu | |
| 7,010,160 B1 * | 3/2006 | Yoshida ........................ | 382/162 |
| 7,013,052 B1 | 3/2006 | Takaoka | |
| 7,113,648 B1 | 9/2006 | Aihara | |
| 7,796,831 B2 | 9/2010 | Tanaka | |
| 7,925,047 B2 | 4/2011 | Xiao et al. | |
| 2001/0012399 A1 * | 8/2001 | Tohyama et al. ............. | 382/167 |
| 2001/0036311 A1 * | 11/2001 | Tomomatsu ................... | 382/168 |
| 2002/0097439 A1 * | 7/2002 | Braica .......................... | 358/3.26 |
| 2004/0234155 A1 | 11/2004 | Hoshuyama | |
| 2007/0052838 A1 * | 3/2007 | Zhang ........................... | 348/362 |

(Continued)

FOREIGN PATENT DOCUMENTS

CN    1198059 A    11/1998

(Continued)

OTHER PUBLICATIONS

Korean Office Action dated Mar. 30, 2010 and English translation thereof issued in Korean Application No. 10-2008-0085456, which is a Korean counterpart of related U.S. Appl. No. 12/199,263.
Chinese Office Action dated Mar. 19, 2010 and English translation thereof in counterpart Chinese Application No. 200810171499.7.

(Continued)

*Primary Examiner* — John Lee
(74) *Attorney, Agent, or Firm* — Holtz, Holtz, Goodman & Chick, PC

(57) ABSTRACT

A tone correcting apparatus includes: a first determination unit that determines which one of first brightness levels that are previously defined a focused region corresponds to, the focused region being selected from among a plurality of block regions that are set to cover an entire area of the image; a second determination unit that determines which one of second brightness levels that are previously defined an adjacent block region corresponds to, the adjacent block region being at least one of the block regions that is adjacent to the focused region; and a correction unit that corrects a brightness of pixels included in the focused region based on a combination of the first brightness level determined by the first determination unit and the second brightness level determined by the second determination unit.

12 Claims, 17 Drawing Sheets

U.S. PATENT DOCUMENTS

| | | |
|---|---|---|
| 2007/0070214 A1 | 3/2007 | Nakamura |
| 2007/0147701 A1* | 6/2007 | Tanaka .......................... 382/274 |
| 2007/0195171 A1* | 8/2007 | Xiao et al. ............... 348/207.99 |
| 2008/0013800 A1 | 1/2008 | Steinberg et al. |

FOREIGN PATENT DOCUMENTS

| | | |
|---|---|---|
| EP | 1 814 082 A2 | 8/2007 |
| JP | 06-215128 A | 8/1994 |
| JP | 06-245071 A | 9/1994 |
| JP | 08-062741 A | 3/1996 |
| JP | 9-65252 A | 3/1997 |
| JP | 11-122488 A | 4/1999 |
| JP | 2000-004393 A | 1/2000 |
| JP | 2000-209437 A | 7/2000 |
| JP | 2001-243463 A | 9/2001 |
| JP | 2002-185771 A | 6/2002 |
| JP | 2002-199221 A | 7/2002 |
| JP | 2003-502758 A | 1/2003 |
| JP | 2004-038842 A | 2/2004 |
| JP | 2004-200971 A | 7/2004 |
| JP | 2004-215063 A | 7/2004 |
| JP | 2004-235956 A | 8/2004 |
| JP | 2006-324987 A | 11/2006 |
| JP | 2007-018073 A | 1/2007 |
| JP | 2007-201980 A | 8/2007 |
| JP | 2007-221678 A | 8/2007 |

OTHER PUBLICATIONS

Extended European Search Report dated Mar. 17, 2010 (in English) in European Application No. 08015283, which is a counterpart of related U.S. Appl. No. 12/199,263.

U.S. Appl. No. 13/052,882; First Named Inventor: Y. Manabe; Title: "Tone correcting apparatus providing improved tone correction on image"; filed Mar. 22, 2011.

Japanese Office Action dated May 11, 2010, issued in counterpart Japanese Application No. 2007-224985 of related U.S. Appl. No. 12/199,263, and English translation of the Japanese Office Action.

Chinese Office Action dated Sep. 14, 2010, issued in counterpart Chinese Application No. 200810189879.3 of related U.S. Appl. No. 12/199,263, and English translation of the Chinese Office Action.

Japanese Office Action dated Jan. 19, 2010 and English translation thereof issued in counterpart Japanese Application No. 2007-224984.

Japanese Office Action dated Jan. 19, 2010 and English translation thereof issued in Japanese Application No. 2007-224985, which is a counterpart of U.S. Appl. No. 12/199,263.

Yang et al.: "Detecting Faces in Images: A Survey"; IEEE Transactions on pattern analysis and machine intelligence, vol. 24, No. 1, Jan. 2002, pp. 34-58.

Seng et al.: "Improved automatic face detection technique in color images"; IEEE Region 10 conference TEN CON, Nov. 2004; pp. 459-462.

* cited by examiner

FIG. 3

|  |  | FIRST KEY DETERMINATION RESULT (REGION A) | | |
|---|---|---|---|---|
|  |  | LOW | MIDDLE | HIGH |
| SECOND KEY DETERMINATION RESULT (REGION B) | LOW | LOW 1 | LOW 2 | MIDDLE 1 |
|  | MIDDLE | MIDDLE 1 | MIDDLE 1 | MIDDLE 2 |
|  | HIGH | MIDDLE 2 | HIGH 1 | HIGH 2 |

FIG. 5A
$$g(V_{in}, lev, x) = \frac{MAX \times lev + V_{in}^x / MAX^{x-1}}{MAX + V_{in} \times lev} \quad (2)$$
$V_{in}$: INPUT V (0~MAX)
lev: GAIN LEVEL (1~)
x : DEGREE (1~)
$g(V_{in}, lev, x)$: GAIN FUNCTION
FIG. 5B
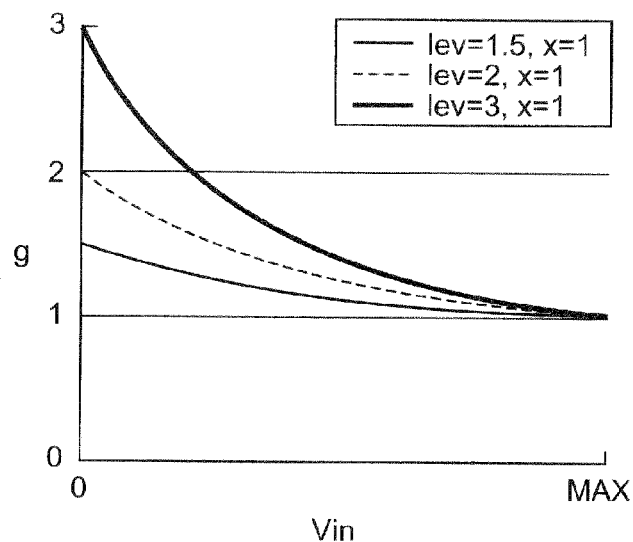
FIG. 5C
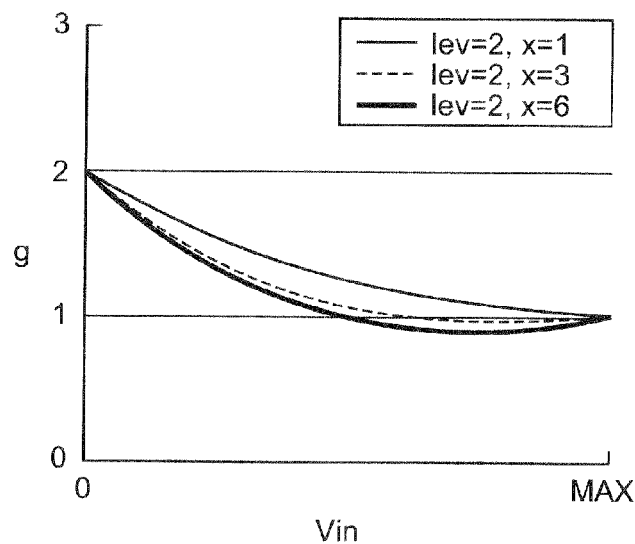

FIG. 6A
glin(Vin,lev,x)=min {g(Vin, lev, x),(lev-1.0) × lin+1.0}     (3)
lim : GAIN LIMIT COEFFICIENT (0~1)
min: FUNCTION FOR OBTAINING MINIMUM
     NUMERIC VALUE IN ARGUMENT LIST
glim(Vin,lev,x): GAIN FUNCTION (AFTER GAIN LIMIT)
FIG. 6B
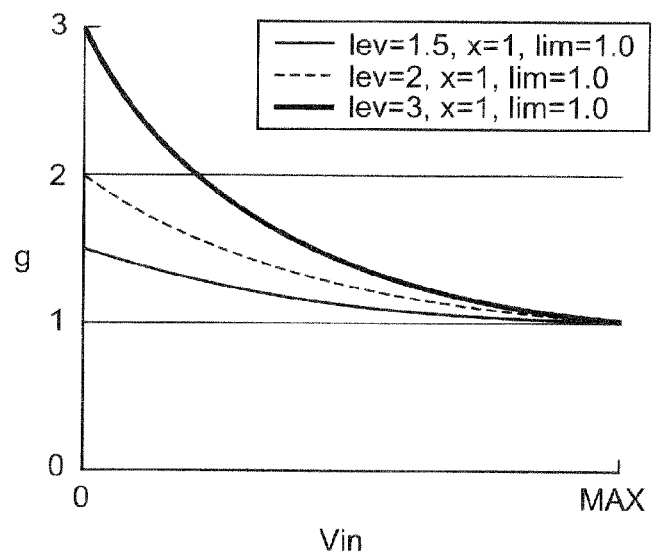
FIG. 6C
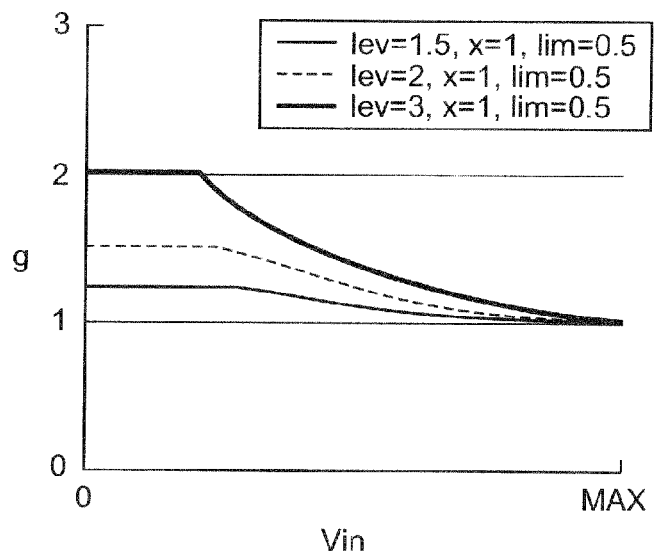

FIG. 7

| NUMBER OF LOW 1 | NUMBER OF HIGH 2 | GAIN LIMIT COEFFICIENT lim |
|---|---|---|
| N OR MORE | M OR MORE | 1.0 |
| | LESS THAN M | 0.9 |
| LESS THAN N | M OR MORE | 0.6 |
| | LESS THAN M | 0.5 |

FIG. 8A
$$golip(Vin, lev, x) = \max\{glim(Vin, lev, x), 1.0\} \qquad (4)$$
max: FUNCTION FOR OBTAINING MAXIMUM NUMERIC VALUE IN ARGUMENT LIST
glim(Vin,lev,x): GAIN FUNCTION (AFTER CLIP)
FIG. 8B
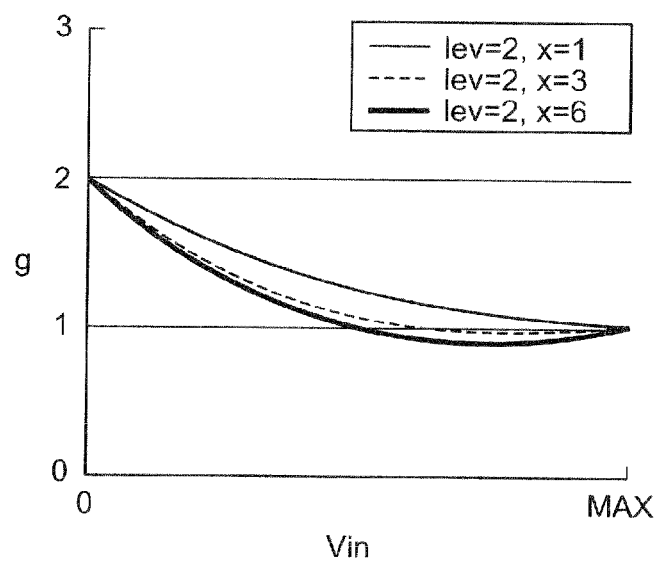
FIG. 8C
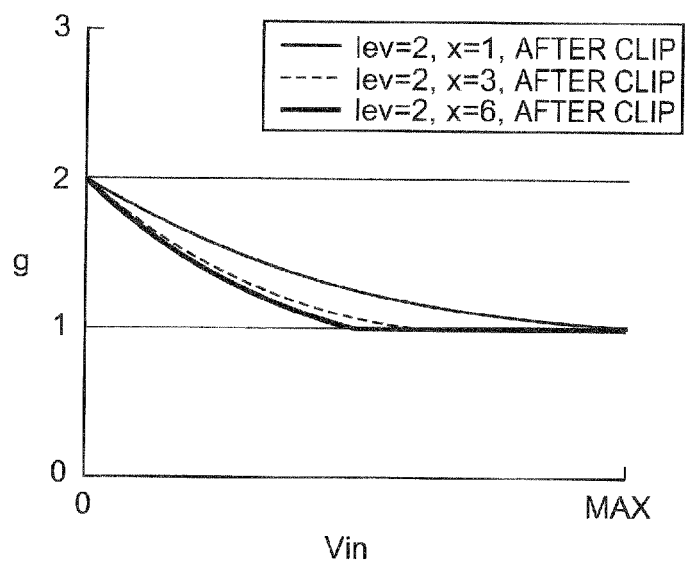

$$\text{lim} = \frac{g(Y_{ave\_face}, lev\_face, x\_face) - 10}{lev\_face - 1.0} \quad (14)$$

lim : GAIN LIMIT COEFFICIENT (0~1)
Yave_face : AVERAGE BRIGHTNESS VALUE OF FACE PORTION
lev_face : GAIN LEVEL OF CLOSE CENTER PIXEL TO FACE CENTER (1~)
x_face : DEGREE OF CLOSE CENTER PIXEL TO FACE CENTER (1~)

TONE CORRECTING APPARATUS PROVIDING IMPROVED TONE CORRECTION ON IMAGE

CROSS-REFERENCE TO THE RELATED APPLICATION(S)

The present application is based upon and claims priority from prior Japanese Patent Application No. 2007-224984, filed on Aug. 31, 2007, the entire content of which are incorporated herein by reference.

TECHNICAL FIELD

The present invention relates to a tone correcting apparatus, a method for correcting a tone of an image, and a computer-readable storage medium containing a sequence of instructions for a program executable by a computer for correcting a tone of an image, which are suitable to be utilized in an image processing apparatus, such as a digital camera.

BACKGROUND

Conventionally, as a method of automatically correcting a tone of an image, there has been a method in which a brightness level of an image is corrected for each of pixels included in the image. An example of such method is described in JP-A-9-065252 (counterpart is: U.S. Pat. No. 5,808,697). In the method, an input image is divided into a plurality of block regions, and an average brightness level (an average of brightness levels of all pixels) is obtained for each of the block regions. Next, a correction curve is independently selected for each of the block regions corresponding to the average brightness level. Next, a plurality of types of correction curves selected for a block region (a main block region) including a target pixel and for a plurality of block regions (subsidiary block regions) which are adjacent to the main block region are subjected to a weighted average to generate a new correction curve, and the new correction curve is used to correct the brightness level of the target pixel. According to the method described above, it is possible to prevent the details of a local portion in the image from being lost by performing a tone correction on the image.

In the conventional method, the correction curve to be used for the correction of the brightness level of each pixel is obtained from the plurality of types of correction curves selected individually for the main block region and the subsidiary block regions. However, each of the correction curves is simply selected in correspondence with the average brightness level of each of the block regions (the main block region and the subsidiary block regions). Therefore, although the details of the local portion in the input image may be maintained by the tone correction, the effect obtained by the tone correction is rather limited.

SUMMARY

One of objects of the present invention is to provide a tone correcting apparatus, a method for correcting a tone of an image, and a computer-readable storage medium containing a sequence of instructions for a program executable by a computer for correcting a tone of an image, which provides improved tone correction in which a feature of each portion in an image is precisely reflected.

According to a first aspect of the present invention, there is provided a tone correcting apparatus for correcting a tone of an image, the apparatus including: a first determination unit that determines which one of first brightness levels that are previously defined a focused region corresponds to, the focused region being selected from among a plurality of block regions that are set to cover an entire area of the image; a second determination unit that determines which one of second brightness levels that are previously defined an adjacent block region corresponds to, the adjacent block region being at least one of the block regions that is adjacent to the focused region; and a correction unit that corrects a brightness of pixels included in the focused region based on a combination of the first brightness level determined by the first determination unit and the second brightness level determined by the second determination unit.

According to a second aspect of the present invention, there is provided a method for correcting a tone of an image, the method including: determining which one of first brightness levels that are previously defined a focused region corresponds to, the focused region being selected from among a plurality of block regions that are set to cover an entire area of the image; determining which one of second brightness levels that are previously defined an adjacent block region corresponds to, the adjacent block region being at least one of the block regions that is adjacent to the focused region; and correcting a brightness of pixels included in the focused region based on a combination of the determined first brightness level and the determined second brightness level.

According to a second aspect of the present invention, there is provided a computer-readable storage medium containing a sequence of instructions for a program executable by a computer for correcting a tone of an image, the program including: instructions for determining which one of first brightness levels that are previously defined a focused region corresponds to, the focused region being selected from among a plurality of block regions that are set to cover an entire area of the image; instructions for determining which one of second brightness levels that are previously defined an adjacent block region corresponds to, the adjacent block region being at least one of the block regions that is adjacent to the focused region; and instructions for correcting a brightness of pixels included in the focused region based on a combination of the determined first brightness level and the determined second brightness level.

BRIEF DESCRIPTION OF THE DRAWINGS

In the accompanying drawings:

FIG. 3 is a diagram showing a relationship between a combination of first and second brightness levels and a third brightness level;

FIG. 5A shows Equation (2) expressing a basic gain function;

FIGS. 5B and 5C are charts for explaining an adjustment characteristic of a gain with a change in a V value which is obtained by the gain function;

FIG. 6A shows Equation (3) expressing a gain function obtained after a gain limit;

FIGS. 6B and 6C are charts for explaining an adjustment characteristic of a gain with a change in a V value which is obtained by a limited gain function;

FIG. 7 is a diagram showing a method of setting a gain limit coefficient;

FIG. 8A shows Equation expressing a clipped gain function;

FIGS. 8B and 8C are charts for explaining an adjustment characteristic of a gain with a change in a V value which is obtained by a clipped gain function;

DETAILED DESCRIPTION

Figure 1:
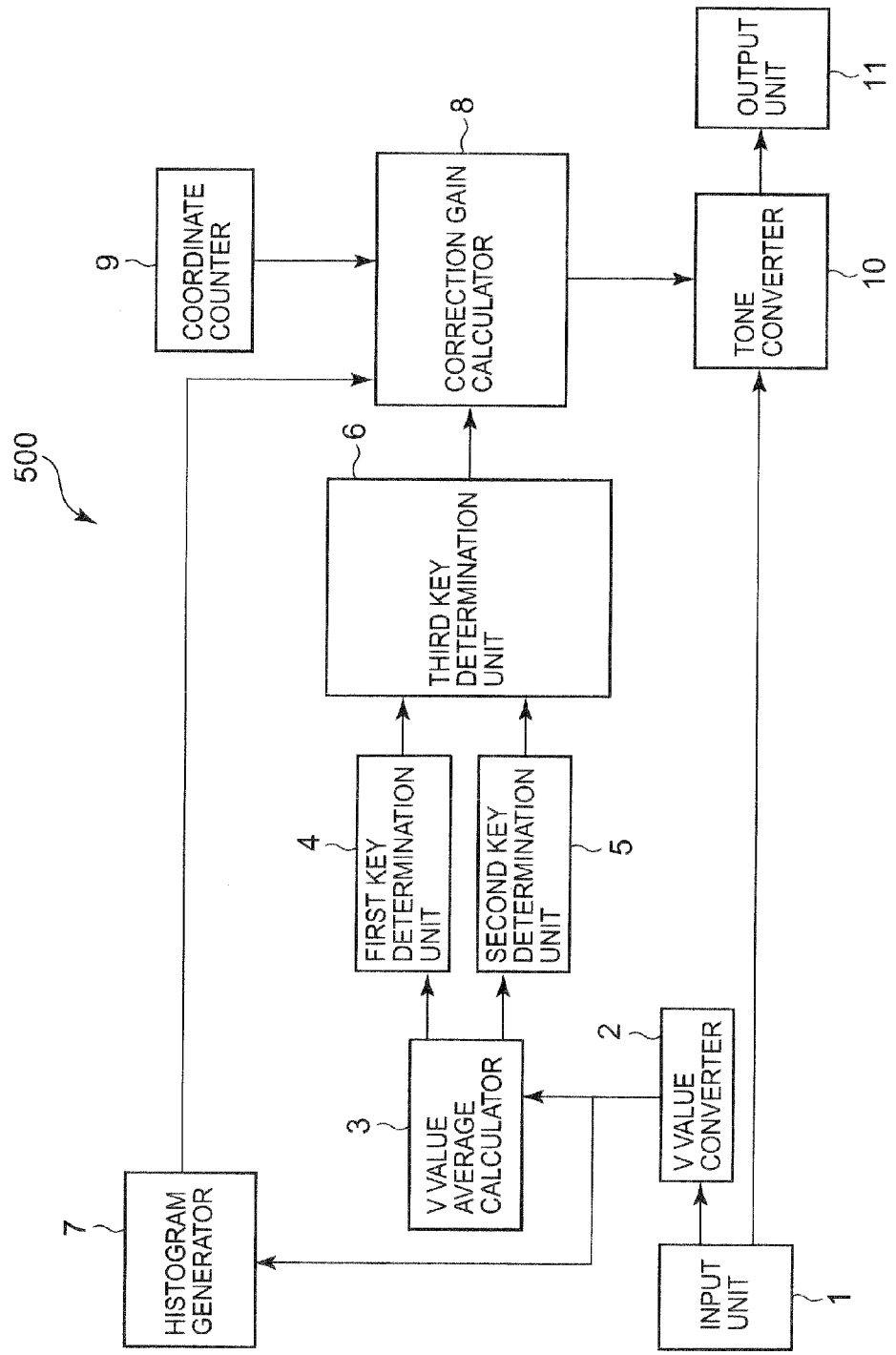
FIG. 1 is a block diagram showing a tone correcting apparatus according to a first embodiment of the present invention.

Embodiments according to the present invention will be described in detail with reference to the accompanying drawings. The scope of the claimed invention should not be limited to the examples illustrated in the drawings.

First Embodiment

A first embodiment according to the present invention will be described below. FIG. 1 is a block diagram showing a configuration of a tone correcting apparatus 500 according to the first embodiment. The tone correcting apparatus 500 serves to automatically correct a tone of an input image. The tone correcting apparatus 500 is incorporated and utilized in an image capturing apparatus, such as a digital camera, and an image processing apparatus, such as a printer, which have various image processing functions.

As shown in FIG. 1, the tone correcting apparatus 500 includes: an input unit 1 for inputting image data including pixel data for each of color components of R, G and B; a V value converter 2; a V value average calculator 3; a first key determination unit 4; a second key determination unit 5; a third key determination unit 6; a histogram generator 7; a correction gain calculator 8; a coordinate counter 9; a tone converter 10; and an output unit 11. The tone converter 10 adjusts, for each pixel, a gain of image data input to the input unit 1.

The input unit 1 is, for example, configured by a frame memory or a video RAM which is implemented by a semiconductor memory chip.

The V value converter 2 serves as an acquiring unit and serves to convert pixel values (R, G and B values) of the image data input to the input unit 1 into a value having V (value: brightness) component in an HSV color space. The V value converter 2 outputs a converted V value (Vin) to the V value average calculator 3 and the histogram generator 7. As is well known, the V value is a maximum value among each of the R, G and B values and is converted in accordance with the following equation (1).

$$Vin = \max(Rin, Gin, Bin) \tag{1}$$

Figure 2A:
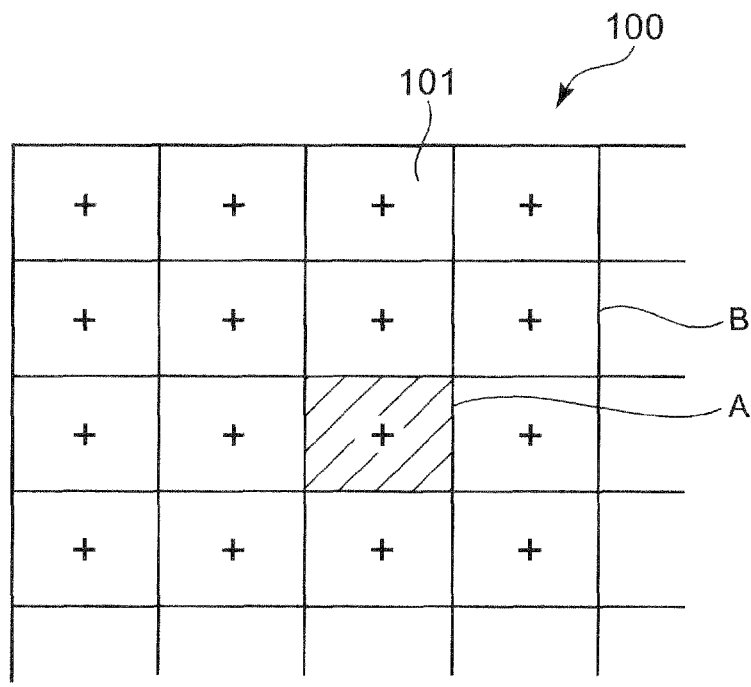
FIGS. 2A and 2B are explanatory diagrams showing a block region in an input image.
Figure 2B:
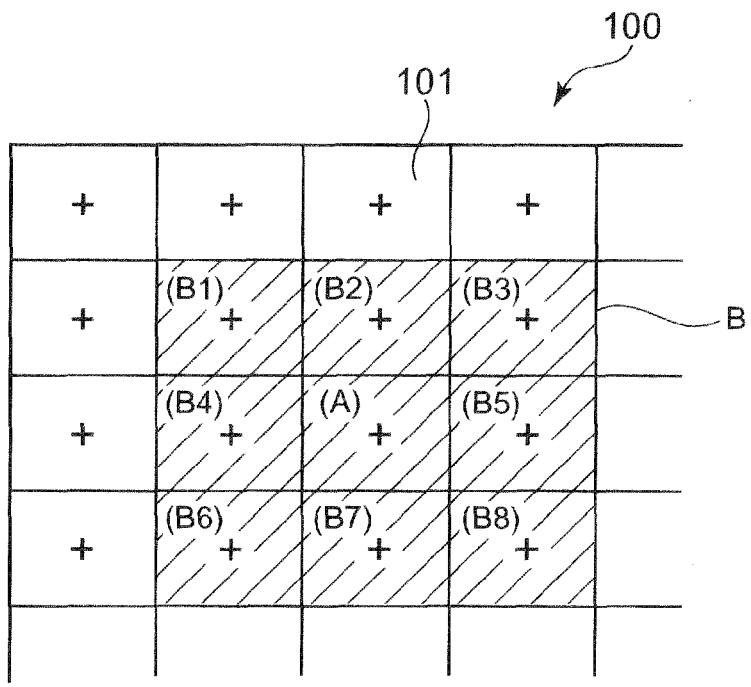

The V value average calculator 3 divides an input image into a plurality of predetermined block regions. The V value average calculator 3 sets the divided block regions into focused regions respectively and calculates an average value of the V values for all pixels in the respective regions (which will be hereinafter referred to as an average V value) for two types of key determining regions having different areas respectively. FIGS. 2A and 2B are explanatory diagrams showing a block region 101 in an input image 100, and a region being hatched in FIGS. 2A and 2B indicates a key determining region.

As shown in FIG. 2A, the V value average calculator 3 sets the block region 101 (indicated by A in the drawing) itself to be a focused region as a first key determining region A, thereby calculating an average V value. As shown in FIG. 2B, the V value average calculator 3 sets, as a second key determining region (an inclusive region) B, a region constituted by the block region 101 (A in the drawing) to be the focused region and eight other block regions 101 (B1, B2, . . . , B8 in the drawing) which are adjacent to and surround the focused region, thereby calculating the average V value.

The first key determination unit 4 determines any brightness level (hereinafter referred to as a first brightness level) in a brightness reference (a first brightness reference) leveled into a plurality of predetermined levels to which a brightness in the first key determining region A corresponds based on the average V value in the same region which is calculated by the V value average calculator 3. In the following description, the determination process will be referred to as a first key determination. The brightness level to be determined is divided into three levels of "Low", "Middle" and "High". A range of the average V value corresponding to each brightness level is obtained by dividing a full range ("0" to "MAX") of the average V value into three equal parts, for example. The V value average calculator 3 and the first key determination unit 4 serve as a first determination unit.

The second key determination unit 5 determines any brightness level (hereinafter referred to as a second brightness level) in a brightness reference (a second brightness reference) leveled into a plurality of predetermined levels to which a brightness in the second key determining region B corresponds based on the average V value in the same region which is calculated by the V value average calculator 3. In the following description, the determination process will be referred to as a second key determination. The brightness level to be determined is also based on the same reference as that in the first key determination and is "Low", "Middle" or "High". The V value average calculator 3 and the second key determination unit 5 serve as a second determination unit.

The third key determination unit 6 serves as a third determination unit and determines a relevance to a brightness level corresponding to a combination of results of the first and second key determinations (the first and second brightness levels), that is, any brightness level (hereinafter referred to as a third brightness level) in a brightness reference (a third brightness reference) leveled in more detail than the brightness reference described above. In other words, the third key determination unit 6 determines a brightness level considering a relative brightness relationship between the eight other block regions 101 (B1, B2, . . . , B8) which are adjacent to the surroundings of the block region 101 to be the focused region for the same block region 101.

In the embodiment, a brightness level to be determined in the third key determination is set to any of six levels including "Low 1", "Low 2", "Middle 1", "Middle 2", "High 1" and "High 2", and the "Low 1" indicates the lowest level and the "High 2" indicates the highest level. A relationship between a combination of the first and second brightness levels and the third brightness level is previously defined, for example, as shown in FIG. 3.

The histogram generator 7 serves as histogram acquiring unit and counts the number of pixels for each V value from the V values (Vin) of all the pixels converted by the V value converter 2, and outputs, to the correction gain calculator 8, a result of the count as histogram information indicative of a distribution of brightness in the whole input image.

The correction gain calculator 8 serves as a first characteristic setting unit, a second characteristic setting unit, a calculation unit, a contrast determination unit, an upper limit adjusting unit, a distribution status determination unit, and a lower limit adjusting unit. The correction gain calculator 8 individually calculates a correcting gain in the adjustment of the gain for each pixel through the tone converter 10 using a gain function (a correction function) which will be described below, that is, a correction coefficient for a tone correction to be multiplied by each pixel value of image data based on the result of the third key determination and the histogram information and sets the correction coefficient to the tone converter 10.

The coordinate counter 9 counts a coordinate position (a transverse position and a longitudinal position) of a pixel to be a gain calculating target in the correction gain calculator 8.

The tone converter 10 serves as a correction unit and serves to adjust again of image data every pixel with the gain calculated for each pixel in the correction gain calculator 8. More specifically, the tone converter 10 converts the pixel value (the R, G or B value) of each pixel into a pixel value obtained by multiplying the gain. The tone converter 10 outputs, to the output unit 11, image data obtained after the gain adjustment.

The output unit 11 is, for example, configured by a frame memory or a video RAM which is implemented by a semiconductor memory chip. The output unit 11 may be configured as the same component as the input unit 1.

Detailed description will be given to the operation for calculating a correcting gain in the correction gain calculator 8. First, the correction gain calculator 8 individually sets, to all of the pixels, a gain adjustment characteristic for a change in the V value of each of the pixels which is a basis in the gain calculation, that is, a correction characteristic obtained by a gain function which will be described below.

More specifically, there is set, as a typical correction characteristic, a correction characteristic corresponding to the third brightness level determined every block region 101 through the third key determination from plural types of correction characteristics which are predetermined corresponding to the brightness levels in the six levels including the "Low 1", "Low 2", "Middle 1", "Middle 2", "High 1" and "High 2" (see FIG. 3) for a center pixel of each of the block regions 101.

A new correction characteristic is acquired through a linear interpolation from the typical correction characteristic set to the center pixels which are adjacent to pixels other than the center pixel and is set to the pixels other than the center pixel. Referring to the interpolation of the correction characteristic set to the other pixels, it is also possible to employ another interpolating method such as a spline interpolation in place of the linear interpolation.

Figure 4A:
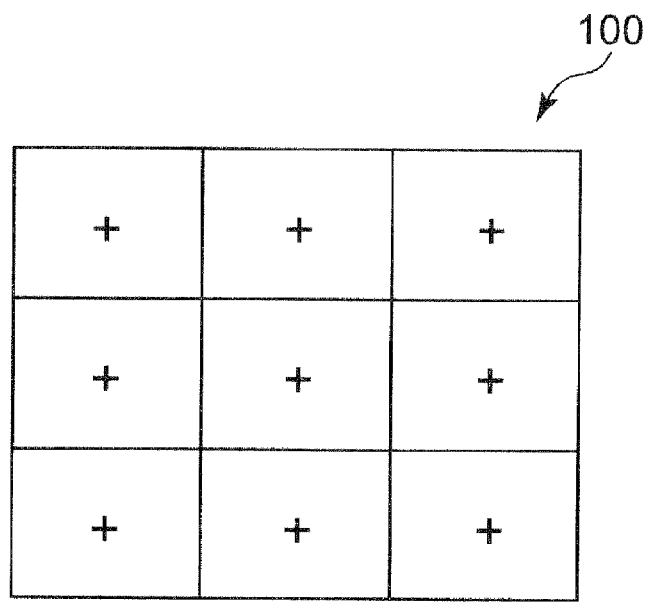
FIG. 4A is a diagram showing a block region in an input image and a center pixel thereof.
Figure 4B:
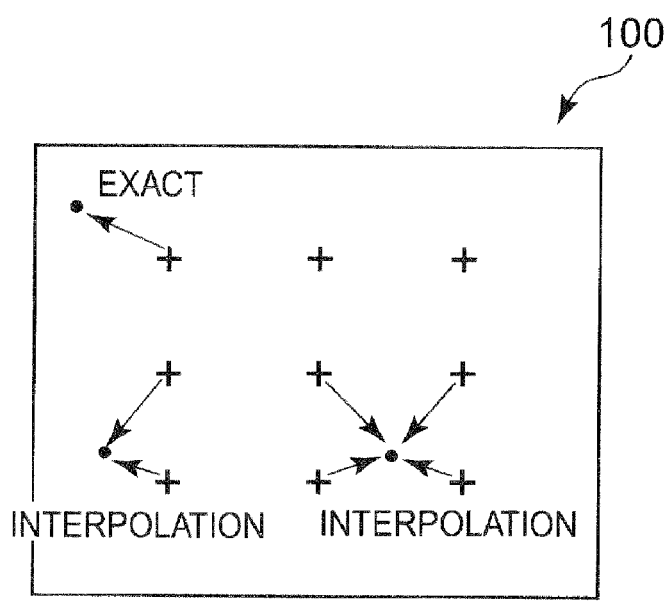
FIG. 4B is a conceptual diagram showing a relationship between the center pixel and the other pixels in an interpolation of a correction characteristic.

FIG. 4A is a diagram showing nine block regions obtained by dividing the input image 100 and their center pixels ("+" in the drawing) and FIG. 4B is a diagram showing a relationship between pixels other than the center pixel ("•" in the drawing) and the center pixel used for an acquirement (interpolation) of the correction characteristic of the pixel. As shown in FIG. 4B, in the interpolation of the correction characteristics set to the other pixels, the typical correction characteristics for four center pixels at a maximum which are adjacent to the same pixels are used. Referring to the pixels in the block regions positioned in upper, lower, left and right corner portions of the input image, the typical correction characteristics set to the center pixels in the block regions are exactly set as the correction characteristics.

Next, detailed description will be given to the typical correction characteristic and the correction characteristic.

The typical correction characteristic and the correction characteristic which are set to each pixel are obtained by a gain function g (Vin, lev, x) expressed in Equation (2) shown in FIG. 5A. The correction gain calculator 8 sets, as the typical correction characteristic or the correction characteristic for each pixel, values of a gain level (lev) and a degree (x) to be parameters (variables) for predetermining the characteristic in the gain function g (Vin, lev, x).

FIGS. 5B and 5C are charts showing an adjustment characteristic of the gain (g) for a change in the V value (Vin) obtained by the gain function g (Vin, lev, x), and the gain (g) calculated through the gain function g (Vin, lev, x) is decreased with an increase in the V value (Vin) and is 1.0 when the "V value=MAX." Moreover, a difference in the value of the parameter is reflected by the characteristic in the following manner.

More specifically, a value of the degree (x) is equal as shown in FIG. 5B, the whole gain (g) is increased with an increase in the gain level (lev) and a maximum value of the gain (g) is a double with "lev=2". In the case in which a value of the gain level (lev) is equal as shown in FIG. 5C, the gain (g) in a region having a middle brightness, particularly, a highlight (a maximum V value) side is reduced with an increase in the degree (x) and the gain (g) on the highlight side (a larger V value side) is equal to or smaller than 1.0 depending on the value.

In other words, when the gain set to the gain converter 10 is to be calculated every pixel by using the gain function g (Vin, lev, x), it is possible to enhance a tone in a dark portion of the input image if the gain level (lev) is increased to wholly cause the gain to be larger. At the same time, it is possible to reduce a whiteout (or "blown out") in a bright portion of the input image if the degree (x) is increased to cause the gain on the highlight (the maximum V value) side to be equal to or smaller than 1.0.

For this reason, a value decreased in order with an increase in the brightness level is set to the gain level (lev) corresponding to each of the brightness levels in the six levels ("Low 1", . . . , "High 2") and a value increased in order with the increase in the brightness level is set to the degree (x) corresponding to each of the brightness levels, which is not shown. Moreover, the values of both of the parameters (lev, x) are previously determined based on an empirical rule.

In the correction gain calculator 8, the gain function g (Vin, lev, x) is not exactly used to calculate the gain but the gain is calculated through a gain function glim (Vin, lev, x) expressed in Equation (3) shown in FIG. 6A.

The parameter (lim) in the gain function glim (Vin, lev, x) is a gain limit coefficient for determining the upper limit of the gain. By setting the value to be equal to or smaller than 1.0, it is possible to adjust the upper limit of the gain corresponding to the value of the gain level (lev). A value of the gain limit coefficient is set to be equal over the whole image (all pixels). In the following description, the gain function glim (Vin, lev, x) will be simply referred to as a "limited gain function".

FIG. 6B is a chart showing an adjustment characteristic of a gain for a change in the V value of each pixel with "lim=1". In this case, there is obtained the same characteristic as that in the case in which the gain limit is not performed. FIG. 6C is a chart showing an adjustment characteristic of a gain for a change in the V value of each pixel with "lim=0.5". By setting the gain limit coefficient to be equal to or smaller than 1.0, it is possible to reduce the gain for the pixel on a side where the V value is larger when the value of the gain level (lev) is smaller. In other words, it is possible to enhance a contrast of an image (i.e. the blackness of the dark portion) by reducing the gain for a pixel in the dark portion.

The value of the gain limit coefficient (lim) is set corresponding to the contrast of the image. In the embodiment, a contrast determination for determining (estimating) a contrast status of an image is performed based on the result of the third key determination to set a value corresponding to a result of the determination.

More specifically, the number of the block regions in the "Low 1" in which the brightness level is the lowest in the third key determination and that of the block regions in the "High 2" in which the brightness level is the highest are individually counted and it is ascertained whether each count number is equal to or larger than a threshold (N, M) determined every level or is smaller than the threshold (N, M) for both of the brightness levels. As shown in FIG. 7, the contrast status is determined based on a combination of the number of the "Low 1" (the number which is equal to or larger than N and the number which is smaller than N) and the number of the "High 2" (the number which is equal to or larger than M and the number which is smaller than M) and the gain limit coefficient is set corresponding to the result of the determination.

FIG. 7 shows an example of the case in which the contrast status is divided into four levels to perform a determination. For example, when the number of the "Low 1" is equal to or larger than the threshold N and the number of the "High 2" is equal to or larger than the threshold M, it is determined that the contrast of the image is the highest and the value of the gain limit coefficient is set to be "1.0". In other words, the contrast enhancement is not substantially performed. When the number of the "Low 1" is smaller than the threshold N and the number of the "High 2" is smaller than the threshold M, it is determined that the contrast of the image is the lowest and the value of the gain limit coefficient is set to be "0.5".

On the other hand, it is possible to enhance the contrast of the image (i.e. the blackness of the dark portion) by using the limited gain function to adjust the upper limit of the gain for each pixel. Also in that case, as shown in FIG. 5C, the gain (g) on the highlight side (the side where the V value is great) excluding a highlight portion (a pixel portion having the V value to be a maximum value) is equal to or smaller than 1.0 when the value of the degree (x) set to each pixel is increased to some degree in the calculation of the gain. In other words, a pixel value of a bright portion in the image is subjected to a negative correction.

This causes a useless reduction in a contrast in an image having a poor tone in a bright portion and results in a tone jump in which a great tone difference is made between a portion having a whiteout caused therein and a close portion to the whiteout therearound (the vicinity of the maximum value of the V value) in an image having a large whiteout (a large number of whiteout portions).

For this reason, in the correction gain calculator 8, it is determined whether or not the negative correction of a pixel value for a pixel in a bright portion is inappropriate for the input image, that is, the input image has a poor tone in the bright portion or a large whiteout in the calculation of the gain of each pixel) (which will be hereinafter referred to as a highlight determination). If it is determined that the negative correction is inappropriate for the image, a gain is calculated through a gain function gclip (Vin, lev, x) expressed in Equation (4) shown in FIG. 8A.

In other words, by clipping (limiting) a lower limit of the gain to "1.0", it is possible to avoid a useless reduction in a contrast in the case in which the input image has a poor tone in the bright portion and a generation of a tone jump in the case in which the image has a large whiteout. In the following description, the gain function gclip (Vin, lev, x) will be simply referred to as a "clipped gain function"

FIGS. 8B and 8C are charts showing a difference in an adjustment characteristic of a gain depending on the presence of the clip in the case in which the value of the gain limit coefficient (lim) is set to be "1.0". FIG. 8B shows an adjustment characteristic obtained when the clip is not performed and FIG. 8C shows an adjustment characteristic obtained when the clip is performed.

Figure 9:
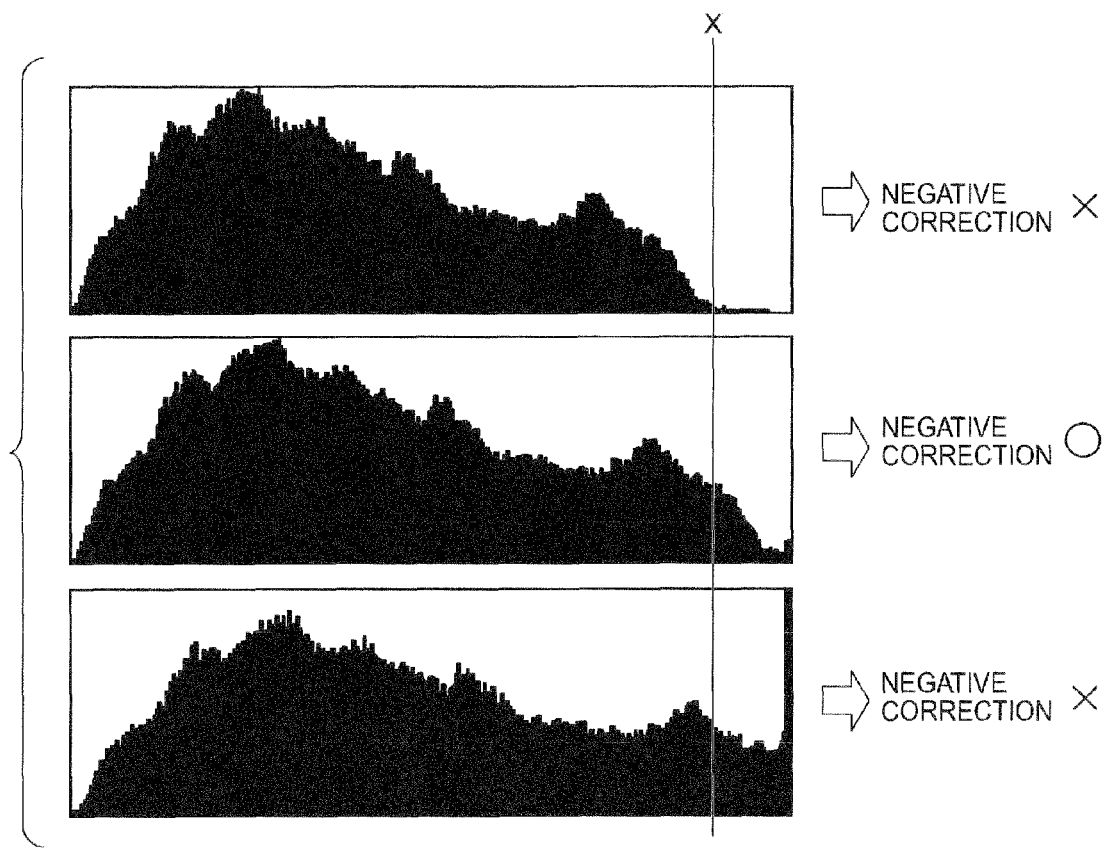
FIG. 9 is a view showing a method of performing a highlight determination.

Moreover, the highlight determination is performed in the following manner based on the histogram information acquired by the histogram generator 7 (the distribution of brightness depending on the number of pixels for each V value in the whole image). More specifically, as shown in an upper section of FIG. 9, when the number of pixels having a larger tone value than a tone value X in a tone position from a maximum tone value (a maximum V value) to several percent (for example, 5% to 10%) is equal to or smaller than a predetermined certain number, it is determined that the input image has a poor tone in the bright portion and the negative correction is inappropriate for the input image. As shown in a lower section of FIG. 9, when the number of pixels of the maximum tone value (the maximum V value) is equal to or larger than the predetermined certain number, it is determined that the input image has a large whiteout and the negative correction is inappropriate for the input image. As shown in a middle section of FIG. 9, when the number of pixels having a larger tone value than a tone value X exceeds the predetermined certain number and the number of pixels having the maximum tone value (the maximum V value) is smaller than the predetermined certain number, that is, the same number corresponds to neither of the two determining conditions, it is determined that the input image has a high tone in the bright portion and the negative correction is appropriate for the input image.

The histogram information to be used for the highlight determination indicates the distribution of brightness depending on the number of pixels for each V value to be a maximum value of each of the R, G and B values. For this reason, also in the case in which the input image has a large number of portions in which a color saturation is generated, it is possible to determine that the negative correction is inappropriate for the input image in the same manner as in an image having a large whiteout. Therefore, it is possible to simultaneously avoid the generation of the tone jump in the vicinity of the portion in which the color saturation is generated in addition to the tone jump in the vicinity of the portion in which the whiteout is generated.

As described above, the correction gain calculator 8 calculates a gain for each pixel by using the clipped gain function gclip (Vin, lev, x) in the case in which a gain clip is required for the input image and sets the same gain as a correcting gain to the tone converter 10 depending on the result of the highlight determination. Furthermore, the correction gain calculator 8 calculates a gain for each pixel by using the limited gain function glim (Vin, lev, x) for the case in which the gain clip is not required for the input image and sets the same gain as a correcting gain to the tone converter 10.

The tone converter 10 adjusts a pixel value of image data every pixel based on the gain calculated corresponding to the result of the highlight determination through the correction gain calculator 8. More specifically, pixel values Rin, Gin and Bin for R, G and B of each input pixel are converted into pixel values Rout, Gout and Bout obtained in accordance with the following equations (5), (6) and (7) or equations (8), (9) and (10).

$$Rout = Rin \times glim(Vin, lev, x) \quad (5)$$

$$Gout = Gin \times glim(Vin, lev, x) \quad (6)$$

$$Bout = Bin \times glim(Vin, lev, x) \quad (7)$$

$$Rout = Rin \times gclip(Vin, lev, x) \quad (8)$$

$$Gout = Gin \times gclip(Vin, lev, x) \quad (9)$$

$$Bout = Bin \times gclip(Vin, lev, x) \quad (10)$$

In other words, the tone converter 10 individually corrects a brightness level (brightness) of each pixel of the input image in accordance with a correction characteristic set to each pixel. Consequently, it is possible to automatically correct the tone of the input image.

Figure 10:
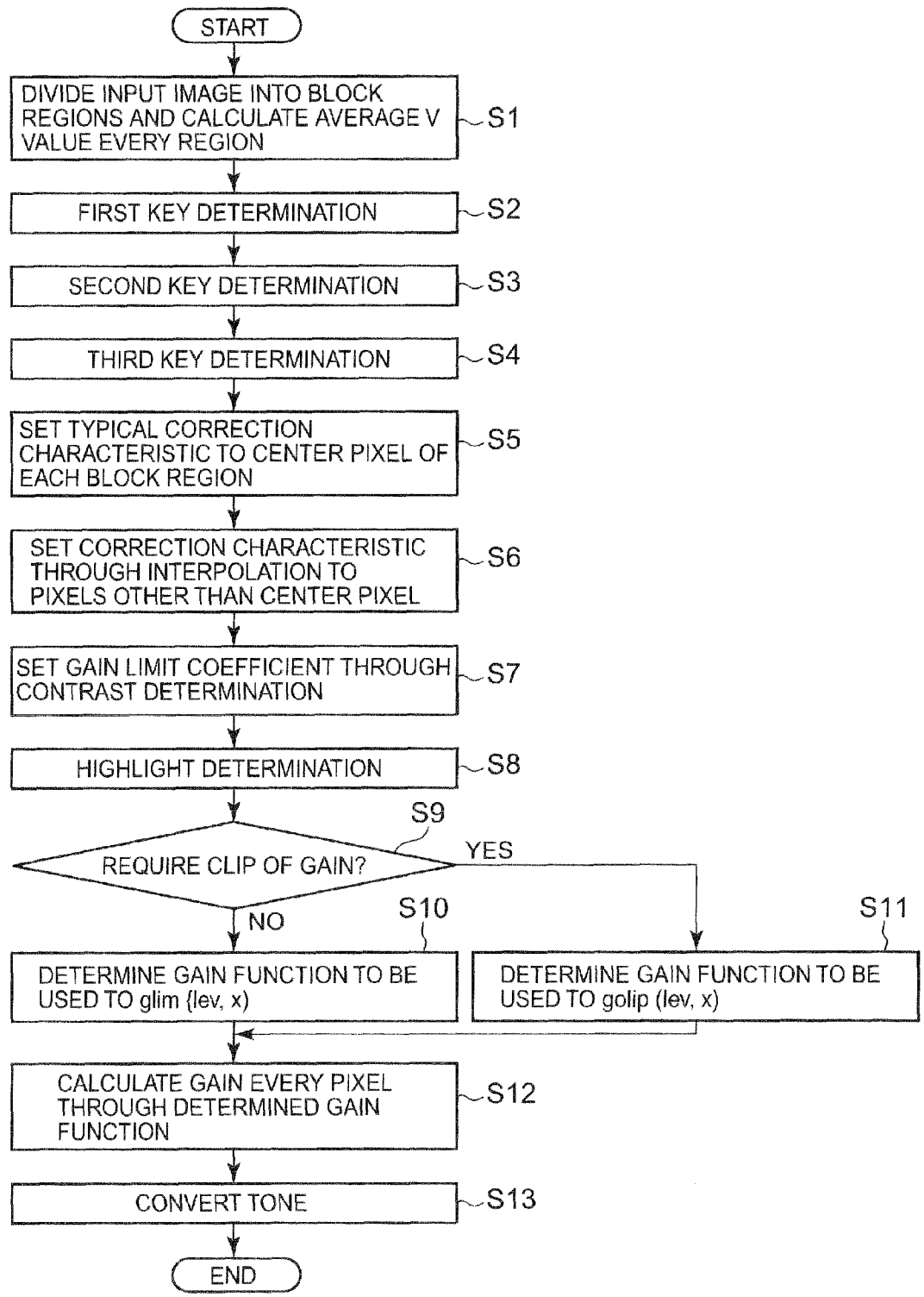
FIG. 10 is a flowchart schematically showing a tone correcting procedure in the tone correcting apparatus according to the first embodiment.

FIG. 10 is a flowchart schematically showing a tone correcting procedure in the tone correcting apparatus 500. As shown in FIG. 10, step S1 indicates an operation of the V value average calculator 3, steps S2 to S4 indicate operations of the first key determination unit 4, the second key determination unit 5 and the third key determination unit 6 respectively, and steps S5 to S12 indicate an operation of the correction gain calculator 8. The operations of steps S12 and S13 are actually executed repetitively at a number of times corresponding to the number of pixels. Moreover, the details of the respective steps will be omitted in order to reduce repetitive description.

As described above, in the tone correcting apparatus 500 according to the embodiment, the brightness level of each of the block regions 101 to be a reference for determining the correction characteristic in the calculation of the gain for each pixel is not obtained from only brightness information such as an average V value of a pixel in the region but is obtained from the determination processes in three levels including the first key determination, the second key determination and the third key determination. In other words, there is obtained the brightness level considering a relationship of a relative brightness with the surroundings as described above. Therefore, the tone correcting apparatus 500 can obtain an excellent tone result for the vicinity of a boundary between bright and dark portions in an image by correcting a brightness of each pixel based on the brightness level. In other words, the tone correcting apparatus 500 can perform a more appropriate tone correction by which the feature of each portion in the image is precisely reflected.

In the calculation of the gain for each pixel, the contrast determination is made for the input image to adjust the upper limit of the gain to be set to each pixel corresponding to the result of the determination. Consequently, it is possible to reduce a gain for the pixel in the dark portion as described above. As a result, it is possible to enhance the contrast of the image (i.e. the blackness of the dark portion).

In the calculation of the gain for each pixel, the highlight determination is performed for the input image and it is determined whether the negative correction of the pixel value for the image in the bright portion is inappropriate for the input image or not. If the negative correction is inappropriate for the image, the lower limit of the gain to be set every pixel is clipped (limited) to "1.0". Consequently, it is possible to prevent a useless reduction in a contrast in the case in which the input image has a poor tone in the bright portion, and a generation of a tone jump in the case in which the input image has a large whiteout and the generation of the tone jump around a portion in which a color saturation is caused.

In the tone correcting apparatus 500, an optional method can be employed for a specific method for individually correcting a brightness of each pixel of an input image based on the brightness level of each of the block regions 101. In the description, although the typical correction characteristic is set to the center pixel of each of the block regions 101 based on the brightness level of each of the block regions 101 and the correction characteristics of the pixels other than the center pixel are set based on the typical correction characteristic, and the gain of each of the pixels is regulated in accordance with the typical correction characteristic and the correction characteristics, the brightness of each of the pixels may be individually corrected by using other methods.

In the embodiment, any of the brightness levels in the six levels to which the brightness of each of the block regions 101 corresponds is determined through the third key determination and the correction characteristic corresponding to the result of the third key determination is selected (set) for each of the block regions 101, and is set as the typical correction characteristic to the center pixel of each of the block regions 101. However, the correction characteristic to be set as the typical correction characteristic may be directly selected based on only the combination of the brightness level determined through the first key determination and the brightness level determined through the second key determination without the execution of the third key determination. In that case, the contrast determination for determining the upper limit of the gain set to each pixel is performed based on information other than the result of the third key determination. This will be described below.

In the embodiment, the input image 100 is divided into the block regions 101 and the brightness level (brightness) of each pixel is corrected every pixel based on the brightness level of each of the block regions 101. However, each of the block regions does not need to be obtained by dividing the input image 100 but a plurality of block regions in which the adjacent block regions is partially overlap each other may be set and the brightness level (brightness) of each pixel may be corrected every pixel based on the brightness level of each of the block regions.

While the brightness levels of the first and second key determining regions A and B are divided in the three levels including "Low", "Middle" and "High", the number of the levels of the brightness level to be determined may be two or four or more. In addition, the numbers of the levels of the brightness levels to be determined in the first and second key determining regions A and B may be different from each other.

In the case in which the numbers of the levels are set to be equal to each other in the same manner as in the embodiment, it is also possible to perform weighting over the result of the second key determination by changing criteria in the first key determination for the first key determining region A and the second key determination for the second key determining region B, that is, a relationship between the average V value and the brightness level, for example.

In the embodiment, the brightness level of each of the block regions 101 which is to be finally determined in the third key determination, that is, the brightness to be the reference for determining the typical correction characteristic set to each of the center pixels is determined in the six levels including the "Low 1" to "High 2". However, the number of the levels for the brightness to be the reference for determining the typical correction characteristic may be changed. It is possible to perform the tone correction more precisely in a larger number of levels for the brightness level to be determined. For this reason, it is desirable that the number of the levels for the brightness level to be determined in the third key determination should be larger than that of the levels for the brightness level in the determination of the brightness in each of the first and second key determining regions A and B as in the embodiment.

Although the brightness level of each of the block regions 101 to be finally determined is determined through the determination processes in the three levels including the first key determination, the second key determination and the third key determination in the embodiment, the determination may be performed in the following manner. For example, it is also possible to further set another key determining region including the second key determining region B on an outside thereof, to determine a brightness of the same determining region, and to determine the brightness of each of the block regions 101 which is to be finally determined based on the combination of the result of the determination and the results of the first and second key determinations, that is, to determine the brightness level of each of the block regions 101 through the determination processes in four levels.

In the embodiment, the brightness level of each of the block regions is determined based on the V value of each pixel (more specifically, the average V value of each of the block regions). However, the brightness level of each of the block regions may be determined based on other brightness information such as a Y (brightness) value obtained from the R, G and B values of each pixel. In some cases in which the brightness information other than the V value is used, the color saturation cannot be determined and an unnecessary gain is given to the color saturation portion. For this reason, it is desirable to use the V value for the brightness information. In addition, the brightness level of each of the block regions is not limited to the average of the V values or the Y values of the respective pixels but may be determined based on their histogram.

In the embodiment, the correction characteristic set to each of the block regions 101 (the typical correction characteristic set to the center pixel) is set to have the values of the parameters of the gain function (the gain function to be a basis) which is used in the calculation of the gain for each pixel of the input image, that is, the gain level (lev) and the degree (x), and the values of the parameters are set to each of the block regions 101 corresponding to the result of the third level determination, and the gain for each pixel is calculated based thereon. However, the processing may be changed as follows, for example.

For example, it is also possible to predetermine a combination of a plurality of V values indicative of a plurality of typical points (16 points) exist at a predetermined V value interval over a gain curve representing each correction characteristic and a gain (g) as correction characteristics corresponding to the number of levels for the brightness level to be determined in the third level determination and to set them to each of the block regions 101 corresponding to the result of the third level determination. In that case, referring to the center pixel of each of the block regions 101, the gain (g) corresponding to the V value (Vin) of the center pixel is determined by using the gain curve represented by the typical points corresponding to the result of the third level determination for each of the block regions 101. Referring to the pixels other than the center pixel, the typical points corresponding to the result of the third level determination in each of the block regions 101 including the center pixels which are adjacent thereto are used to interpolate new typical points from the typical points having equal V values respectively, and a gain curve connecting the new typical points thus obtained is used to determine the gain (g) corresponding to the V value (Vin) of the pixel.

In the embodiment, the limited gain function glim (Vin, lev, x) is used to calculate the gain for each pixel, and the value of the gain limit function (lim) is set corresponding to the result of the contrast determination, thereby limiting the upper limit of the gain set to each pixel in that case. However, the processing may be changed as follows, for example.

For example, referring to the input image in which the clip of the gain is not required, the gain of each pixel is calculated by using the gain function g (Vin, lev, x) to be the basis, and the values of the gain level (lev) and the degree (x) set as the typical correction characteristic to the center pixel of each of the block regions 101 (the values corresponding to the result of the third key determination) may be regulated corresponding to the result of the contrast determination to adjust the upper limit of the gain set to each pixel. In that case, the limited gain function is obtained by the following equation (11).

$$g\text{clip}(V\text{in},\text{lev},x)=\max\{g(V\text{in},\text{lev},x),1.0\} \quad (11)$$

In the embodiment, the contrast status of the input image to be the reference for limiting the upper limit of the gain to be set to each pixel is determined based on the result of the third key determination. However, the contrast status of the input image may be determined based on other information. For example, when determining the contrast status of the input image, it is also possible to use the result of the first key determination or that of the second key determination in place of the result of the third key determination or to use both of the results of the determinations. In the case in which the tone correcting apparatus is employed for a digital camera, the determination may be made based on an EV value (an exposure time).

In addition, it is also possible to employ a configuration capable of manually limiting the upper limit of the gain to be set to each pixel without automatically limiting the same upper limit. In that case, it is preferable to employ a configuration in which a user of the tone correcting apparatus can select an enhancing degree of a contrast from a plurality of levels, for example, and to set the gain limit coefficient (lim) to be a predetermined value corresponding to the selected level.

In the case in which the contrast status of the input image is determined based on the result of the third key determination, it is also possible to divide the number of the block regions 101 corresponding to the "Low 1" and that of the block regions 101 corresponding to the "High 2" into two levels by using thresholds (N, M) respectively as in the embodiment and to simply decide the contrast status based on a combination of the corresponding number to the "Low 1" and that to the "High 2" or a combination of a corresponding number of other brightness levels (which may be of three types or more), or based on only a corresponding number of a certain brightness level in addition to the determination of the contrast status based on the combination of the numbers in the two levels. Furthermore, it is also possible to divide a corresponding number of at least one predetermined brightness level into at least three levels by using at least two thresholds, thereby performing a confirmation and to determine the contrast status based on their combination.

The technique for performing the contrast determination for the input image and limiting the upper limit of the gain to be set to each pixel corresponding to the result of the determination, that is, the technique for limiting the upper limit of the correction coefficient for each pixel when individually correcting the brightness of the pixel is also effective for the case in which the brightness level of each of the block regions 101 is determined by a method other than the method described in the embodiment and the brightness of each pixel is individually corrected based on the result of the determination.

Although the highlight determination as to whether the negative correction of the pixel value for the pixel in the bright portion is inappropriate for the input image is performed based on the histogram information indicative of the distribution status of the brightness corresponding to the number of pixels for each V value of the whole image in the embodiment, the histogram information to be used for the highlight determination may indicate the number of the pixels of the V value (tone) every certain section, for example. In the case in which the number of the block regions 101 (the number of divisions for the input image 100 in the embodiment) is increased to some extent, it is also possible to use histogram information having, as an element, the average V value of each of the block regions 101 or to use histogram information having, as an element, an average V value acquired by setting the block regions 101 to be a unit.

While the highlight determination is performed for the whole image and whether the lower limit of the gain to be set to each pixel is clipped is determined in a lump in the embodiment, the following method may be employed. For example, it is also possible to acquire the histogram information about the V value for each of the block regions 101 and to perform the highlight determination every block region 101, and to select the gain function to be used every block region 101 from the limited gain function or the clipped gain function in the calculation of the gain for each pixel based on a result of the determination. In addition, the highlight determination may be performed by setting the block regions 101 as a unit.

The technique for clipping (limiting) the lower limit of the gain to be set every pixel corresponding to the result of the highlight determination, that is, the technique for limiting the lower limit value of the correction coefficient for each pixel into a predetermined value when individually correcting the brightness of the pixel is also effective for the case in which the brightness level of each of the block regions 101 is determined by a method other than the method described in the embodiment and the brightness of each pixel is individually corrected based on the result of the determination.

Although the second key determining region to be the target region for acquiring the second brightness level is set to be the region (the inclusive region) B constituted by the block region 101 (the region A shown in FIG. 2B) to be the focused region and eight other block regions 101 which are adjacent to the surroundings thereof (the regions B1, B2, . . . , B8 shown in FIG. 2B) in the embodiment, the target region for acquiring the second brightness level is not limited thereto in the invention. For example, only the eight other block regions which are adjacent to the surroundings of the focused region may be set to be the second key determining region or some of the eight other block regions which are adjacent to the surroundings of the focused region (the regions B2, B4, B5 and B7 shown in FIG. 2B) may be set to be the second key determining region.

Furthermore, each component of the tone correcting apparatus 500 may be implemented by an ASIC (application specific integrated circuit). In addition, in the functions implemented by the tone correcting apparatus 500, the functions of a whole or part of the portions other than the input unit 1 and the output unit 11 may be implemented in accordance with a software program to be executed by a processor provided in a computer, an imaging apparatus or an image processing apparatus, for example. In the case in which the function to be implemented by the tone correcting apparatus 500 is to be implemented into the imaging apparatus such as a digital camera or a digital video camera, for example, it is also possible to run a tone correcting program for performing a tone correction processing shown in FIG. 10 through a processor included in a computer system provided in the apparatuses. The tone correcting program can be provided in a form of a recording medium, for example, a non-volatile memory such as a mask ROM or an EPROM (Erasable Programmable ROM), a flash memory device, an optical disk and a magnetic disk. Moreover, the tone correcting program may be provided through a wired or wireless computer network.

Second Embodiment

A second embodiment according to the present invention will be described below. In the following description of the second embodiment, identical or equivalent components and operations to those in the first embodiment will be described by using the same reference numerals as those in the first embodiment with reference to the drawings used in the description of the first embodiment.

Figure 11:
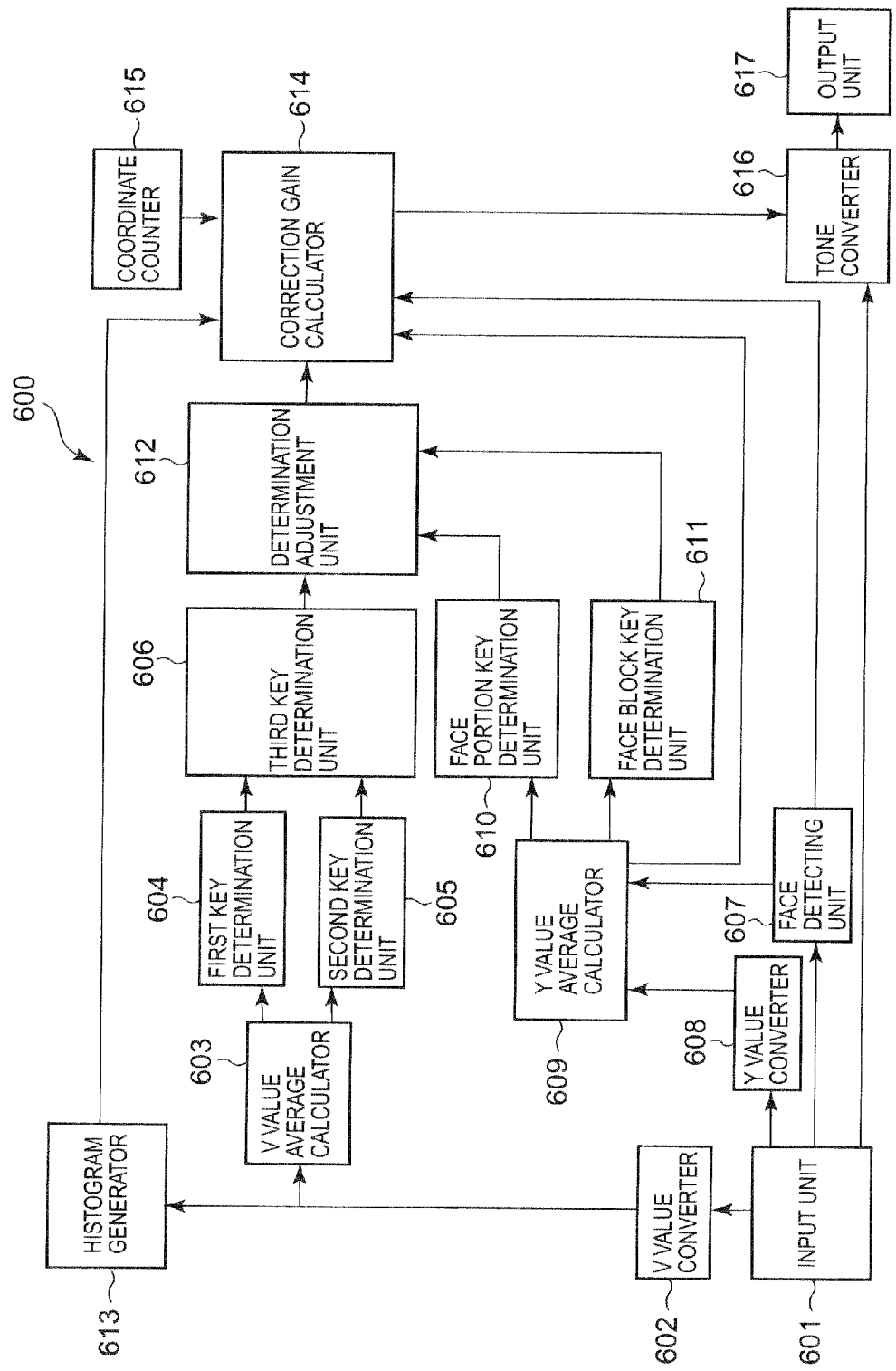
FIG. 11 is a block diagram showing a tone correcting apparatus according to a second embodiment of the present invention.

FIG. 11 is a block diagram showing a configuration of a tone correcting apparatus 600 according to the second embodiment. The tone correcting apparatus 600 automatically corrects a tone of an input image. The tone correcting apparatus 600 is incorporated and utilized in an imaging device such as a digital camera, a printer or various image processing apparatuses having various image processing functions.

As shown in FIG. 11, the tone correcting apparatus 600 includes: an input unit 601 for inputting image data including pixel data for each of color components of R, G and B; a V value converter 602; a V value average calculator 603; a first key determination unit 604; a second key determination unit 605; a third key determination unit 606; a face detecting unit 607; a Y value converter 608; a Y value average calculator 609; a face portion key determination unit 610; a face block key determination unit 611; a determination adjustment unit 612; a histogram generator 613; a correction gain calculator 614; a coordinate counter 615; a tone converter 616; and an output unit 617. The tone converter 616 adjusts, for every pixel, a gain of the image data input to the input unit 601.

The input unit 601 is configured by a frame memory or a video RAM, which is implemented by a semiconductor memory chip.

The V value converter 602 serves to convert pixel values (R, G and B values) of the image data input to the input unit 601 into a value having a V (value: lightness) component in an HSV color space, and outputs a converted V value (Vin) to the V value average calculator 603 and the histogram generator 613. As is well known, the V value is a maximum value for the R, G and B values and is converted in accordance with the following equation (12).

$$V\text{in} = \max(R\text{in}, G\text{in}, B\text{in}) \tag{12}$$

The V value average calculator 603 divides an input image into a plurality of predetermined block regions. The V value average calculator 603 sets the divided block regions into focused regions respectively and calculates an average of the V values of all pixels in the respective regions (which will be hereinafter referred to as an average V value) for two types of key determining regions having different areas respectively. FIGS. 2A and 2B show a block region 101 in an input image 100, and a region shown in a slant line in FIGS. 2A and 2B indicates a key determining region.

More specifically, as shown in FIG. 2A, the V value average calculator 603 sets the block region 101 (shown by A in FIG. 2) itself to be a focused region as a first key determining region A, thereby calculating an average V value. As shown in FIG. 2, the V value average calculator 603 sets, as a second key determining region B, a region constituted by the block region 101 (shown by A in FIG. 2) to be the focused region and eight other block regions 101 (B1, B2, ..., B8 in FIG. 2) which are adjacent to surroundings thereof, thereby calculating the average V value.

The first key determination unit 604 determines any brightness level (hereinafter referred to as a first brightness level) in a brightness reference leveled into a plurality of predetermined levels to which a brightness in the first key determining region A corresponds based on the average V value in the same region which is calculated by the V value average calculator 603. In the following description, the determination process will be referred to as a first key determination. The brightness level to be determined is divided into three levels of "Low", "Middle" and "High". A range of the average V value corresponding to each brightness level is obtained by dividing a full range (0 to a maximum value) of the average V value into three equal parts, for example.

The second key determination unit 605 determines any brightness level (hereinafter referred to as a second brightness level) in a brightness reference leveled into a plurality of predetermined levels to which a brightness in the second key determining region B corresponds based on the average V value in the same region which is calculated by the V value average calculator 603. In the following description, the determination process will be referred to as a second key determination. The brightness level to be determined is also based on the same reference as that in the first key determination and is "Low", "Middle" or "High".

The third key determination unit 606 determines a relevance to a brightness level corresponding to a combination of results of the first and second key determinations (the first and second brightness levels), that is, any brightness level (hereinafter referred to as a third brightness level) in a brightness reference leveled in more detail than the brightness reference described above. In other words, the third key determination unit 606 determines a brightness level considering a relative brightness relationship between the eight other block regions 101 (B1, B2, ..., B8) which are adjacent to the surroundings of the block region 101 to be the focused region for the same block region 101.

In the embodiment, a brightness level to be determined in the third key determination is any of six levels including "Low 1", "Low 2", "Middle 1", "Middle 2", "High 1" and "High 2", and the "Low 1" indicates the lowest level and the "High 2" indicates the highest level. Moreover, a relationship between a combination of the first and second brightness levels and the third brightness level is previously defined as shown in FIG. 3, for example.

The V value average calculator 603, the first key determination unit 604, the second key determination unit 605 and the third key determination unit 606 serve as a first acquiring unit.

The face detecting unit 607 detects a face portion where a human face is positioned in an input image (a static image) and has a predetermined size or more, acquires coordinate information about a corresponding region (a face region) to the face portion thus detected, and outputs the same coordinate information to the Y value average calculator 609 and the correction gain calculator 614. The face detecting unit 607 serves as face detecting unit, and more specifically, is configured by a temporary memory for image data, an image processing circuit, and a plurality of registers for storing a parameter to be used in a face detecting operation. In the embodiment, a well-known method using pattern matching for detecting a face portion having a close feature to a model pattern such as a contour or a color about a face of a person which is prepared (previously stored) can be applied to a method of detecting a face portion. Moreover, it is preferable that the face region acquired as the coordinate information is set to be a rectangular region corresponding to the detected face portion.

The Y value converter 608 converts pixels values (R, G and B values) of image data input to the input unit 601 into a Y (brightness) value in a YUV color space and outputs the converted Y value to the Y value average calculator 609. The Y value is converted in accordance with the following equation (13).

$$Y = 0.299 \times R + 0.587 \times G + 0.114 \times B \tag{13}$$

Figure 12:
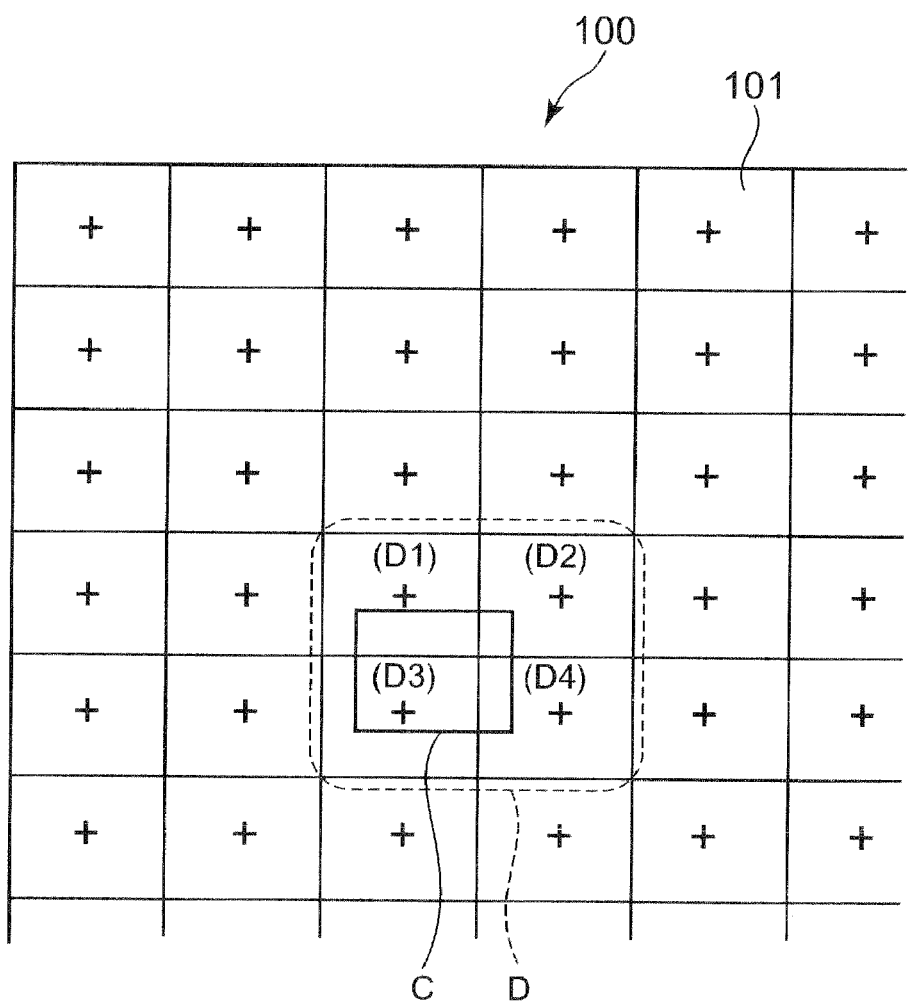
FIG. 12 is an explanatory diagram showing a face portion and a face block in an input image.

The Y value average calculator 609 calculates the face portion in the input image detected by the face detecting unit 607 and an average of Y values of all pixels in at least one block region including a part or whole of the face portion (which will be hereinafter referred to as an average Y value), respectively. In the following description, at least one block region including a part or whole of the face portion, that is, overlapping with the face portion will be referred to as a face block in a lump. FIG. 12 is an explanatory diagram showing the block region 101, a face portion C and the face block D in the input image 100, illustrating an example of the case in which the face block D is configured by four block regions 101 (D1 to D4 in FIG. 12).

The face portion key determination unit 610 serves to determine any of the brightness levels in the brightness reference leveled into a plurality of predetermined levels to which a brightness in the region corresponds based on the average Y value in the face portion C calculated by the Y value average calculator 609. The brightness level to be determined is based on the same brightness reference (the brightness levels in six levels) as that in the third key determination. The face portion key determination unit 610 and the Y value average calculator 609 function as second acquiring unit.

The face block key determination unit 611 determines a corresponding one of the brightness levels through the same brightness reference as that in the third key determination in the same manner as the face portion key determination unit 610 based on the average Y value of each of the block regions 101 belonging to the face block D calculated by the Y value average calculator 609 respectively, and finally determines, as the brightness level of the face block D, the brightness level obtained by averaging the brightness levels of the respective block regions 101 thus determined.

The brightness level is averaged by specifically assigning level values of 1 to 6 to the brightness levels in six levels to calculate the average of the level values (to round figures below a decimal point). For example, if the brightness levels of the block regions 101 (D1 to D4) belonging to the face block D shown in FIG. 12 are "Low 2", "Middle 1", "High 1" and "High 2" respectively, the average of the level values is (2+3+5+6)/4=4 and the "Middle 2" corresponding to a level value of "4" is set to be the brightness level of the face block D. The face block key determination unit 611 and the Y value average calculator 609 function as third acquiring unit.

It is sufficient that the brightness reference for determining the brightness level of the face block D in the face block key determination unit 611 is identical to the brightness reference for determining the brightness level of the face portion C in the face portion key determination unit 610, and the brightness levels of the face portion C and the face block D may be determined based on the brightness reference leveled into a plurality of levels which are different from that in the third key determination.

The determination adjustment unit 612 serves as an adjustment unit and serves to adjust a result of the third key determination (a third brightness level) in the third key determination unit 606 based on the results of the key determinations through the face portion key determination unit 610 and the face block key determination unit 611, that is, the brightness level of the face portion C and the averaged brightness level of the face block D for each of the block regions 101 belonging to the face block D.

Figure 13:
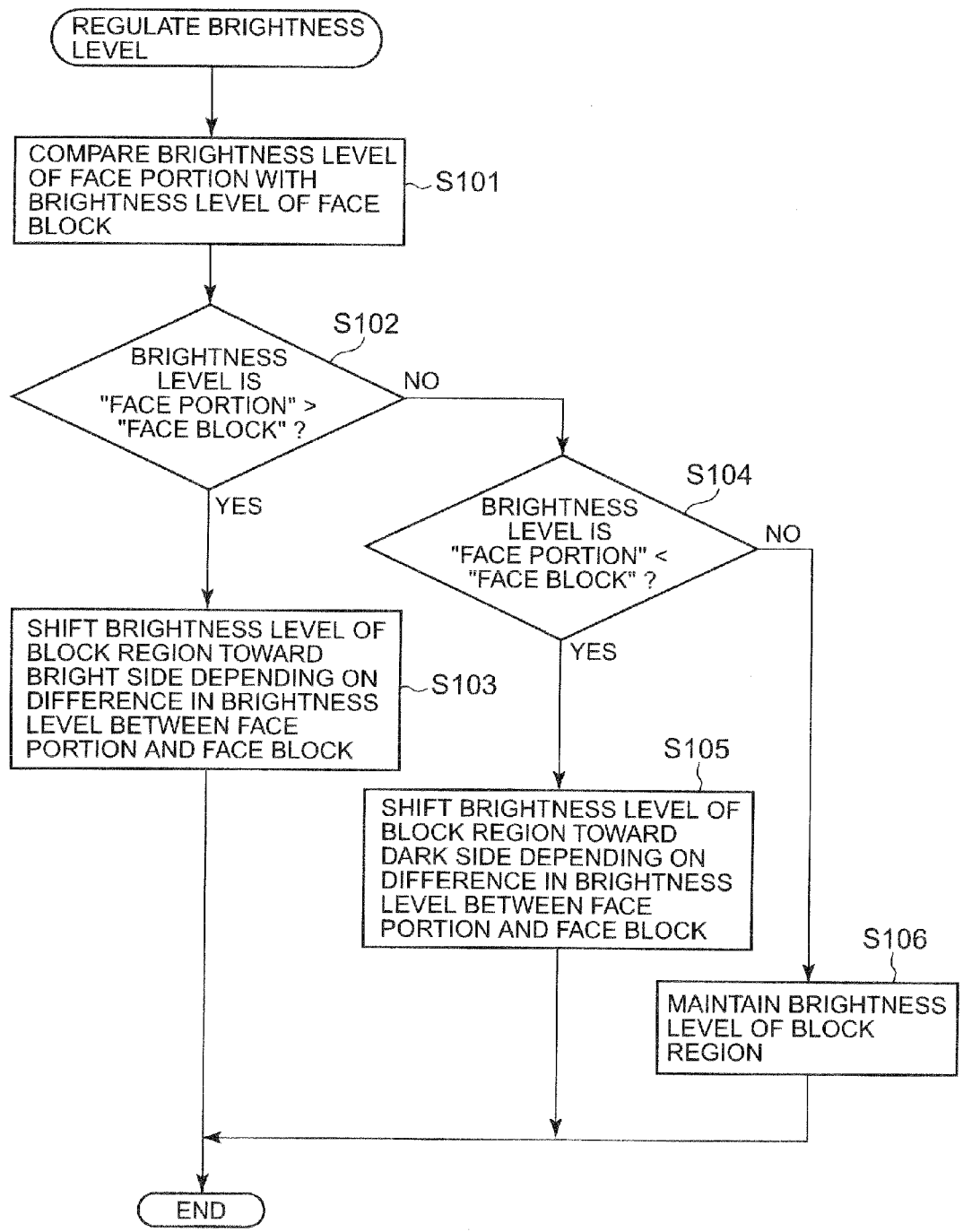
FIG. 13 is a flowchart showing specific details of an adjustment of brightness level in each block region performed by a determination adjustment unit.

Details of the adjustment are shown in FIG. 13. The determination adjustment unit 612 compares the brightness level of the face portion C with that of the face block D (step S101) and shifts the brightness level of each of the block regions 101 belonging to the face block D toward a bright side depending on a difference between the brightness level of the face portion C and that of the face block D if the brightness level of the face portion C is higher, that is, the face portion C is brighter (YES in step S102) (step S103).

To the contrary, if the brightness level of the face block D is higher, that is, the face block D is brighter (NO in step S102 and YES in step S104), the brightness level of each of the block regions 101 belonging to the face block D is shifted toward a dark side depending on the difference between the brightness level of the face portion C and that of the face block D (step S105).

If the brightness level of the face portion C and that of the face block D are identical to each other (NO in both of steps S102 and S104), the brightness level of each of the block regions 101 belonging to the face block D is exactly maintained (step S106).

In steps S103 and S105, a shift amount in shifting the brightness level of the block region 101 toward the bright side or the dark side depending on the difference between the brightness level of the face portion C and that of the face block D is an adjustment degree that is previously determined. The shift amount is changed by one level every time the level difference between the face portion C and the face block D is varied by one level or is changed by one level every time the level difference is varied by two levels, for example. It is preferable to increase the shift amount (adjustment degree) when the difference between the brightness level of the face portion C and that of the face block D is larger. When the shift amount is excessively increased, there is also a higher possibility that a balance with the peripheral block regions 101 might be deteriorated.

Although the description has been given to the case in which the face detected in the input image 100, that is, the face portion C exists in one place, the determination adjustment unit 612 adjusts the brightness level for each of the block regions 101 belonging to the face block D if a plurality of face portions C is detected. In that case, the brightness level of the block region 101 is regulated based on the brightness levels of the face portion C and the face block D thereof having a higher priority as compared with a predetermined reference (an area of the face portion C) when the face portions C exist close to each other and there is a portion overlapping with each face block D (the block region 101).

The histogram generator 613 counts the number of pixels for each V value from the V values (Vin) of all the pixels converted by the V value converter 602, and outputs, to the correction gain calculator 614, a result of the count as histogram information indicative of a distribution of brightness in the whole input image.

The correction gain calculator 614 serves as a characteristic setting unit (a first characteristic setting unit, a second characteristic setting unit and a third characteristic setting unit), a calculation unit and a determination unit. The correction gain calculator 614 individually calculates a correcting gain in a gain adjustment for each pixel through the tone converter 616 by using a gain function (a correction function) which will be described below, that is, a correction coefficient for a tone correction which is to be multiplied by each pixel value of image data based on the brightness level to be the result of the third key determination which is output from the determination adjustment unit 612 or the brightness level obtained after the adjustment and the histogram information, and sets the correction coefficient to the tone converter 616.

The coordinate counter 615 counts a coordinate position (a transverse position and a longitudinal position) of a pixel to be a gain calculating target in the correction gain calculator 614.

The tone converter 616 serves to adjust a gain of image data every pixel with the gain calculated for each pixel in the correction gain calculator 614. More specifically, the tone converter 616 converts the pixel value (the R, G or B value) of each pixel into a pixel value obtained by multiplying the gain coefficient. The tone converter 616 outputs, to the output unit 617, image data obtained after the gain adjustment.

The output unit 617 is a frame memory or a video RAM which is implemented by a semiconductor memory chip, for example. The output unit 617 may be configured by the same component as the input unit 601.

In the embodiment, the correction gain calculator 614 and the tone converter 616 serve as a correction unit.

Detailed description will be given to the operation for calculating a correcting gain in the correction gain calculator 614. First, the correction gain calculator 614 individually sets, to all of the pixels, a gain adjustment characteristic for a change in the V value of each of the pixels which is a basis in the gain calculation, that is, a correction characteristic obtained by a gain function which will be described below.

More specifically, there is set, as a typical correction characteristic, a correction characteristic corresponding to the third brightness level determined every block region 101 through the third key determination from plural types of correction characteristics which are predetermined corresponding to the brightness levels in the six levels including the "Low 1", "Low 2", "Middle 1", "Middle 2", "High 1" and "High 2" (see FIG. 3) for a center pixel of each of the block regions 101.

A new correction characteristic is acquired through a linear interpolation from the typical correction characteristic set to the center pixels which are adjacent to pixels other than the center pixel and is set to the pixels other than the center pixel. Referring to the interpolation of the correction characteristic set to the other pixels, it is also possible to employ another interpolating method such as a spline interpolation in addition to the linear interpolation.

FIG. 4A is a diagram showing nine block regions obtained by dividing the input image 100 and their center pixels ("+" in the drawing) and FIG. 4B is a diagram showing a relationship between pixels other than the center pixel ("•" in the drawing) and the center pixel used for an acquirement (interpolation) of the correction characteristic of the pixel. As shown in FIG. 4B, in the interpolation of the correction characteristics set to the other pixels, the typical correction characteristics for four center pixels at a maximum which are adjacent to the same pixels are used. Referring to the pixels in the block regions positioned in upper, lower, left and right corner portions of the input image, the typical correction characteristics set to the center pixels in the block regions are exactly set as the correction characteristics. Next, detailed description will be given to the typical correction characteristic and the correction characteristic.

The typical correction characteristic and the correction characteristic which are set to each pixel are obtained by a gain function g (Vin, lev, x) expressed in Equation (2) shown in FIG. 5A. The correction gain calculator 614 sets, as the typical correction characteristic or the correction characteristic for each pixel, values of a gain level (lev) and a degree (x) to be parameters (variables) for predetermining the characteristic in the gain function g (Vin, lev, x).

FIGS. 5B and 5C are charts showing an adjustment characteristic of the gain (g) for a change in the V value (Vin) obtained by the gain function g (Vin, lev, x), and the gain (g) calculated through the gain function g (Vin, lev, x) is decreased with an increase in the V value (Vin) and is 1.0 with the V value which is equal to a maximum value. Moreover, a difference in the value of the parameter is reflected by the characteristic in the following manner.

More specifically, a value of the degree (x) is equal as shown in FIG. 5B, the whole gain (g) is increased with an increase in the gain level (lev) and a maximum value of the gain (g) is a double with "lev=2". In the case in which a value of the gain level (lev) is equal as shown in FIG. 5C, the gain (g) in a region having a middle brightness, particularly, a highlight (a maximum V value) side is reduced with an increase in the degree (x) and the gain (g) on the highlight side (a larger V value side) is equal to or smaller than 1.0 depending on the value.

In other words, when the gain set to the gain converter 616 is to be calculated every pixel by using the gain function g (Vin, lev, x), it is possible to enhance a tone in a dark portion of the input image if the gain level (lev) is increased to wholly cause the gain to be larger. At the same time, it is possible to reduce a whiteout in a bright portion of the input image if the degree (x) is increased to cause the gain on the highlight (the maximum V value) side to be equal to or smaller than 1.0.

For this reason, a value decreased in order with an increase in the brightness level is set to the gain level (lev) corresponding to each of the brightness levels in the six levels ("Low 1", . . . , "High 2") and a value increased in order with the increase in the brightness level is set to the degree (x) corresponding to each of the brightness levels, which is not shown. Moreover, the values of both of the parameters (lev, x) are previously determined based on an empirical rule.

In the correction gain calculator 614, the gain function g (Vin, lev, x) is not exactly used to calculate the gain but the gain is calculated through a gain function glim (Vin, lev, x) expressed in Equation (3) shown in FIG. 6A.

The parameter (lim) in the gain function glim (Vin, lev, x) is a gain limit coefficient for determining the upper limit of the gain. By setting the value to be equal to or smaller than 1.0, it is possible to adjust the upper limit of the gain corresponding to the value of the gain level (lev). In the embodiment, a value of the gain limit coefficient is set to be equal over the whole image (all pixels). In the following description, the gain function glim (Vin, lev, x) will be simply referred to as a "limited gain function".

FIG. 6B is a chart showing an adjustment characteristic of a gain for a change in the V value of each pixel with "lim=1". In this case, there is obtained the same characteristic as that in the case in which the gain limit is not performed. FIG. 6C is a chart showing an adjustment characteristic of a gain for a change in the V value of each pixel with "lim=0.5". By setting the gain limit coefficient to be smaller than 1.0, it is possible to reduce the gain for the pixel on a side where the V value is larger when the value of the gain level (lev) is smaller. In other words, it is possible to enhance a contrast of an image (i.e. the blackness of the dark portion) by reducing the gain for a pixel in the dark portion.

Figures 14A, 14B:
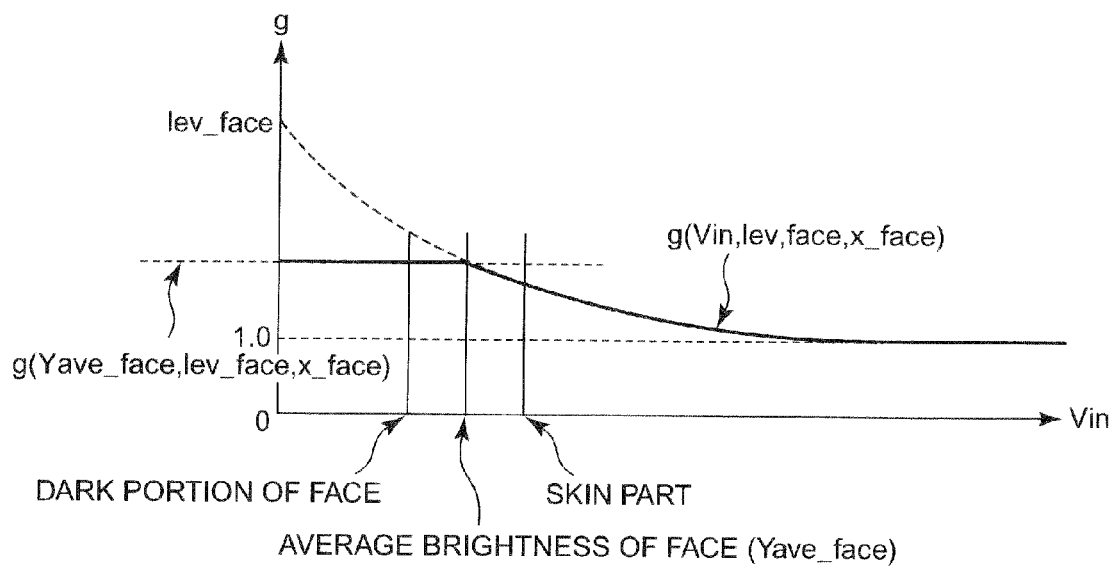
FIG. 14A shows Equation (14) expressing a gain limit coefficient.
FIG. 14B is a chart for explaining an adjustment characteristic of a gain which is obtained by using the gain limit coefficient.

In the embodiment, in the case in which a face portion of an optional person having a predetermined size or more is detected from the input image through the face detecting unit 607, a value calculated by Equation (14) shown in FIG. 14A is set to the gain limit coefficient (lim). In Equation (14), the parameter Yave_face represents an average Y value of the face portion C (see FIG. 12) calculated by the Y value average calculator 9. The parameters lev_face and x_face represent a gain level (lev) and a degree (x) which are set as a typical correction characteristic to the closest center pixel to central coordinates of the face portion C in the center pixel of each of the block regions 101. The function g (Yave, lev_face, x_face) represents a gain corresponding to the average Y value of the face portion calculated in accordance with the typical correction characteristic of the center pixel, and a ratio of the gain level (lev_face) of the typical correction characteristic to the gain (hereinafter referred to as a face portion gain) is represented as a gain limit coefficient (lim).

FIG. 14B is a chart showing an adjustment characteristic of a gain with respect to a change in a V value of each pixel which is obtained by using the gain limit coefficient (lim) acquired as described above. In other words, the gain limit coefficient (lim) is set to be a value calculated by the equations described above so that the gain for a pixel having a smaller V value than the average Y value of the face is limited to a gain g (Yave, lev_face, x_face), which corresponds to the average Y value of the face portion.

Consequently, there is performed a contrast enhancement to which importance is attached to a tone of the face portion in the image (which will be hereinafter referred to as a "face prioritized contrast enhancement").

In the case in which the face portion of the optional person having the predetermined size or more is not detected from the input image through the face detecting unit 607 differently from the above description, a contrast determination for determining (estimating) a contrast status of the input image is performed based on the result of the third key determination to set a value corresponding to the result of the determination.

More specifically, the number of the block regions in the "Low 1" in which the brightness level is the lowest in the third key determination and that of the block regions in the "High 2" in which the brightness level is the highest are individually counted and it is ascertained whether each count number is equal to or larger than a threshold (N, M) determined every level or is smaller than the threshold (N, M) for both of the brightness levels. The contrast status is determined based on a combination of the number of the "Low 1" (the number which is equal to or larger than N and the number which is smaller than N) and the number of the "High 2" (the number which is equal to or larger than M and the number which is smaller than M) and the gain limit coefficient is set corresponding to the result of the determination.

For example, in the case in which the contrast status is divided into four levels to perform a determination, it is determined that the contrast of the image is the highest and the value of the gain limit coefficient is set to be "1.0" when the number of the "Low 1" is equal to or larger than the threshold (N) and the number of the "High 2" is equal to or larger than the threshold (M). In other words, the contrast enhancement is not substantially performed. When the number of the "Low 1" is smaller than the threshold (N) and the number of the "High 2" is smaller than the threshold (M), it is determined that the contrast of the image is the lowest and the value of the gain limit coefficient is set to be "0.5".

On the other hand, it is possible to perform the enhancement in the face priority contrast by using the limited gain function to adjust the upper limit of the gain for each pixel. Also in that case, as shown in FIG. 5C, the gain (g) on the highlight side (the side where the V value is great) excluding a highlight portion (a pixel portion having the V value to be a maximum value) is equal to or smaller than 1.0 when the value of the degree (x) set to each pixel is increased to some degree in the calculation of the gain. In other words, a pixel value of a bright portion in the image is subjected to a negative correction.

This causes a useless reduction in a contrast in an image having a poor tone in a bright portion and results in a tone jump in which a great tone difference is made between a portion having a whiteout caused therein and a close portion to the whiteout therearound (the vicinity of the maximum value of the V value) in an image having a large whiteout (a large number of whiteout portions).

For this reason, in the correction gain calculator 614, it is determined whether or not the negative correction of a pixel value for a pixel in a bright portion is inappropriate for the input image, that is, the input image has a poor tone in the bright portion or a large whiteout in the calculation of the gain of each pixel) (which will be hereinafter referred to as a highlight determination). If it is determined that the negative correction is inappropriate for the image, a gain is calculated through a gain function gclip (Vin, lev, x) expressed in Equation (4) shown in FIG. 8A.

In other words, by clipping (limiting) a lower limit of the gain to "1.0", it is possible to avoid a useless reduction in a contrast in the case in which the input image has a poor tone in the bright portion and a generation of a tone jump in the case in which the image has a large whiteout. In the following description, the gain function gclip (Vin, lev, x) will be simply referred to as a "clipped gain function".

FIGS. 8B and 8C are charts showing a difference in an adjustment characteristic of a gain depending on the presence of the clip in the case in which the value of the gain limit coefficient (lim) is set to be "1.0". FIG. 8B shows an adjustment characteristic obtained when the clip is not performed and FIG. 8C shows an adjustment characteristic obtained when the clip is performed.

In the embodiment, the highlight determination is performed in the following manner based on the histogram information acquired by the histogram generator 613 (the distribution of brightness depending on the number of pixels for each V value in the whole image). More specifically, as shown in an upper section of FIG. 9, when the number of pixels having a larger tone value than a tone value X in a tone position from a maximum tone value (a maximum V value) to several percent (for example, 5% to 10%) is equal to or smaller than a predetermined certain number, it is determined that the input image has a poor tone in the bright portion and the negative correction is inappropriate for the input image. As shown in a lower section of FIG. 9, when the number of pixels of the maximum tone value (the maximum V value) is equal to or larger than the predetermined certain number, it is determined that the input image has a large whiteout and the negative correction is inappropriate for the input image. As shown in a middle section of FIG. 9, when the number of pixels having a larger tone value than a tone value X exceeds the predetermined certain number and the number of pixels having the maximum tone value (the maximum V value) is smaller than the predetermined certain number, that is, the same number corresponds to neither of the two determining conditions, it is determined that the input image has a high tone in the bright portion and the negative correction is appropriate for the input image.

The histogram information to be used for the highlight determination indicates the distribution of brightness depending on the number of pixels for each V value to be a maximum value for each of the R, G and B values. For this reason, also in the case in which the input image has a large number of portions in which a color saturation is generated, it is possible to determine that the negative correction is inappropriate for the input image in the same manner as in an image having a large whiteout. Therefore, it is possible to simultaneously avoid the generation of the tone jump in the vicinity of the portion in which the color saturation is generated in addition to the tone jump in the vicinity of the portion in which the whiteout is generated.

As described above, the correction gain calculator 614 calculates a gain for each pixel by using the clipped gain function gclip (Vin, lev, x) in the case in which a gain clip is required for the input image and sets the same gain as a correcting gain to the tone converter 616 depending on the result of the highlight determination. Furthermore, the correction gain calculator 614 calculates a gain for each pixel by using the limited gain function glim (Vin, lev, x) in the case in which a gain clip is not required for the input image and sets the same gain as a correcting gain to the tone converter 616.

The tone converter 616 adjusts a pixel value of image data every pixel with the gain calculated corresponding to the result of the highlight determination through the correction gain calculator 614. More specifically, pixel values Rin, Gin and Bin for R, G and B of respective pixels which are input are converted into pixel values Rout, Gout and Bout obtained in accordance with the following equations (15), (16) and (17) or equations (18), (19) and (20).

$$Rout = Rin \times glim(Vin, lev, x) \quad (15)$$

$$Gout = Gin \times glim(Vin, lev, x) \quad (16)$$

$$Bout = Bin \times glim(Vin, lev, x) \quad (17)$$

$$Rout = Rin \times gclip(Vin, lev, x) \quad (18)$$

$$Gout = Gin \times gclip(Vin, lev, x) \quad (19)$$

$$Bout = Bin \times gclip(Vin, lev, x) \quad (20)$$

In other words, the tone converter 616 individually corrects a brightness level (brightness) of each pixel of the input image in accordance with a correction characteristic set to each pixel. Consequently, it is possible to automatically correct the tone of the input image.

Figure 15:
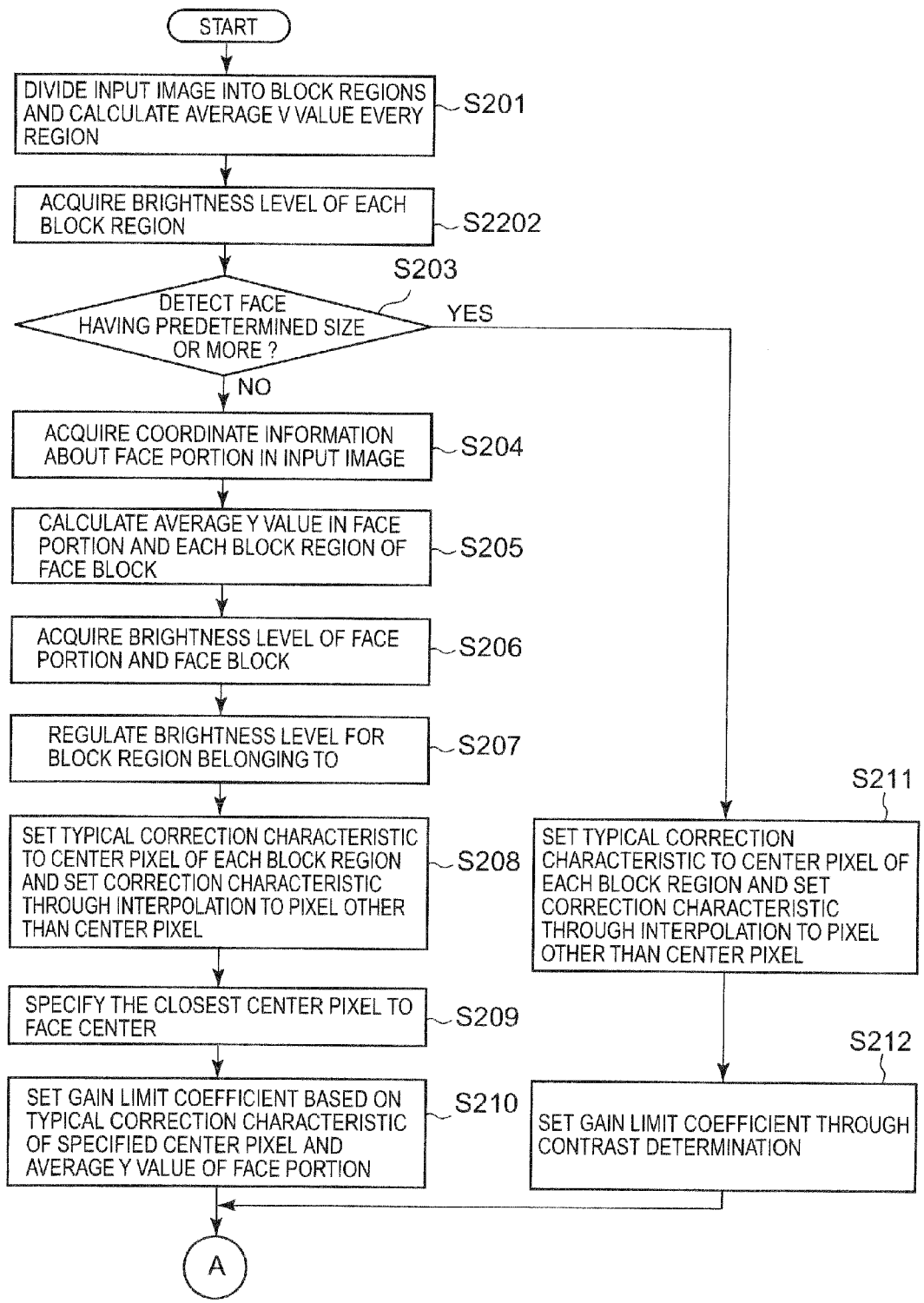
FIG. 15 is a flowchart showing a detail of an operation of the tone correcting apparatus according to the second embodiment.
Figure 16:
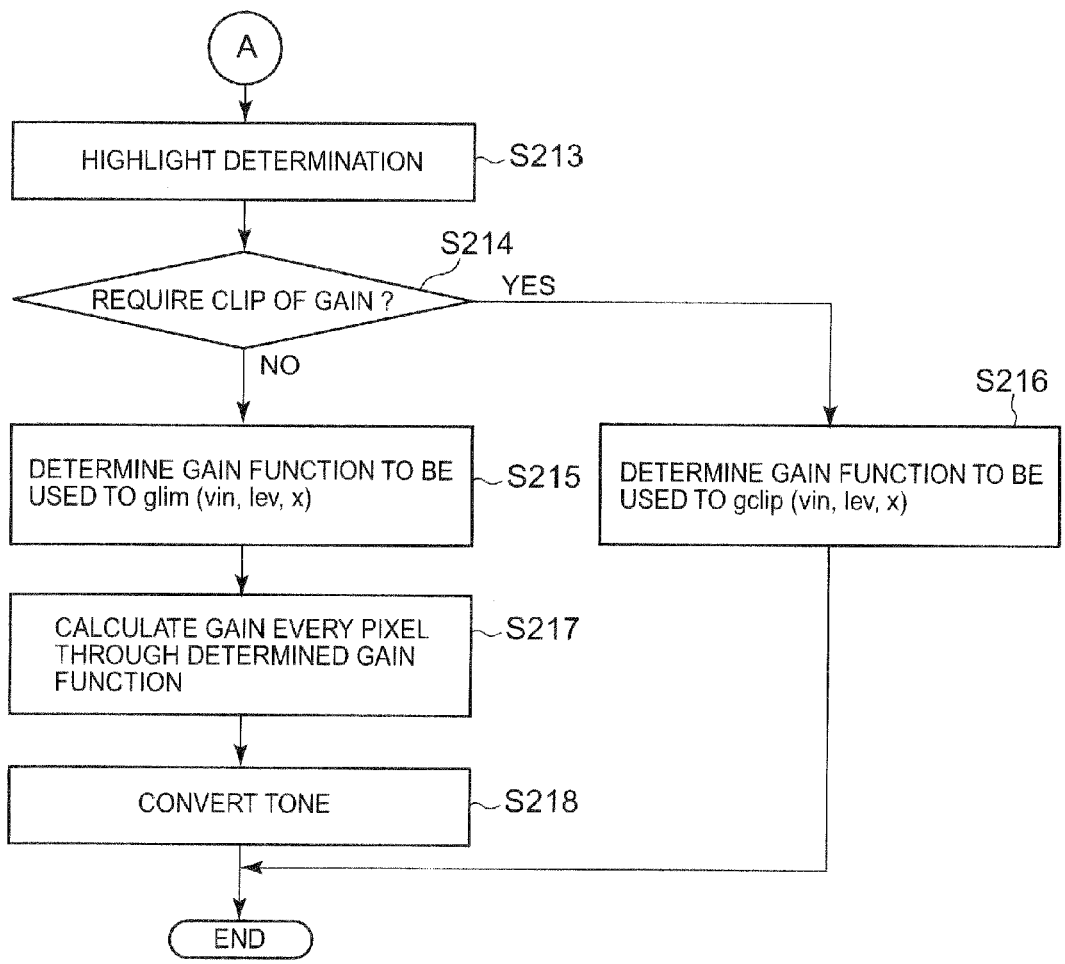
FIG. 16 is a flowchart showing a detail of an operation of the tone correcting apparatus according to the second embodiment.

FIGS. 15 and 16 are flowcharts showing details of an operation by the tone correcting apparatus 600. Although the details of respective steps shown in FIGS. 15 and 16 will be omitted in order to reduce repetitive description, step S201 indicates an operation of the V value average calculator 603, step S202 indicates operations of the first key determination unit 604, the second key determination unit 605 and the third key determination unit 606. Moreover, step S204 indicates an operation of the face detecting unit 607, step S205 indicates an operation of the Y value average calculator 609, and step S206 indicates operations of the face portion key determination unit 610 and the face block key determination unit 611. Moreover, step S207 indicates an operation of the determination adjustment unit 612. The details of step S207 are described above with reference to FIG. 13.

Steps S208 to S217 indicate an operation of the correction gain calculator 614 and step S218 indicates an operation of the tone converter 616. The operations of steps S217 and S218 are actually performed repetitively at a number of times corresponding to the number of pixels.

As described above, in the tone correcting apparatus 600 according to the embodiment, in the case in which a face having a predetermined size or more exists in the input image 100, an upper limit of a gain to be set to all of pixels in an adjustment of the gain of the image data input to the input unit 601 every pixel in the tone converter 616 is regulated depending on a brightness of the face portion C in the input image 100. More specifically, as described above, a face prioritized contrast enhancement is performed over the input image 100 by using the limited gain function (see FIGS. 6A and 14A) setting, as a parameter, a gain limit coefficient (lim) calculated with the average Y value of the face portion C as the gain function to be used for calculating the gain for each pixel.

Consequently, it is possible to reduce a gain for a pixel in a dark portion such as a portion around eyes or a mouth in the face portion and to cause a tone in the face portion to have a modulation by tightening the dark portion of the face to be properly dark. In other words, it is possible to perform a tone correction to which importance is attached to a face portion of a person in an image. As a result, it is possible to maintain a appropriate tone in the face portion of the person in the tone correction of the image.

When acquiring the brightness level of each of the block regions 101 which is a reference for determining a correction characteristic (a typical correction characteristic) to be set to the center pixel of each of the block regions 101 prior to an operation for setting the correction characteristic to be used for calculating the gain every pixel, the brightness levels of the block regions 101 which are once determined through the first to third determinations are regulated (shifted toward a high level side or a low level side) depending on a difference between the brightness level of the face portion C and an average level of the face block D (the average of the brightness levels of the block regions 101 belonging to the face block D) for the block regions 101 belonging to the face block D (the block regions 101 overlapping with the face portion C and including a part or whole thereof) (see FIG. 12).

Consequently, it is possible to compensate for an excess and deficiency of a gain for the pixel in the face portion C which is generated when a size of the face portion C is almost equal to that of each of the block region 101 or is smaller than that of each of the block regions 101.

Figure 17A:
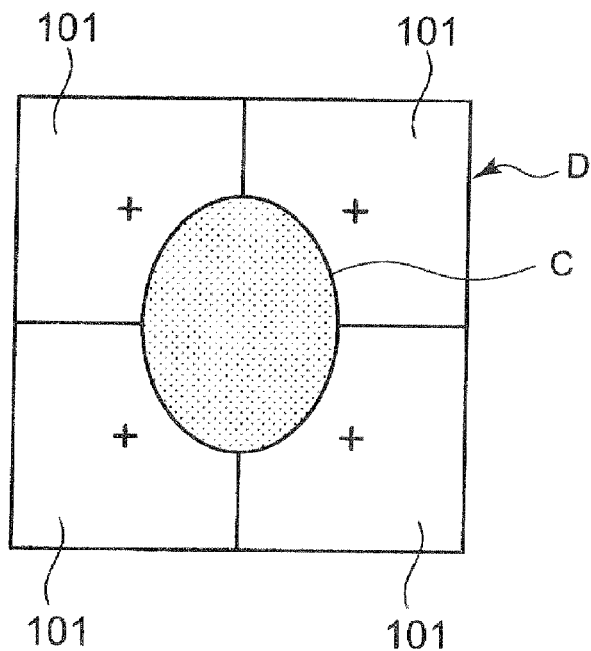
FIGS. 17A and 17B are explanatory diagrams showing an example of a case in which an excess and deficiency is generated on a gain in pixels within the face portion.

For example, when the face portion C is dark and a background is bright as shown in FIG. 17A, the brightness level based on the average V value of the block region 101 belonging to the face block D is raised if the brightness level adjustment is not performed. For this reason, the gain level of each pixel in the face block D is reduced. As a result, the gain for the pixel in the face portion C is made insufficient. However, it is possible to avoid the insufficiency of the gain for the face portion C by limiting the brightness level as described above. Consequently, it is possible to eliminate a situation in which the face portion C is unnaturally darkened with the tone correction.

Figure 17B:
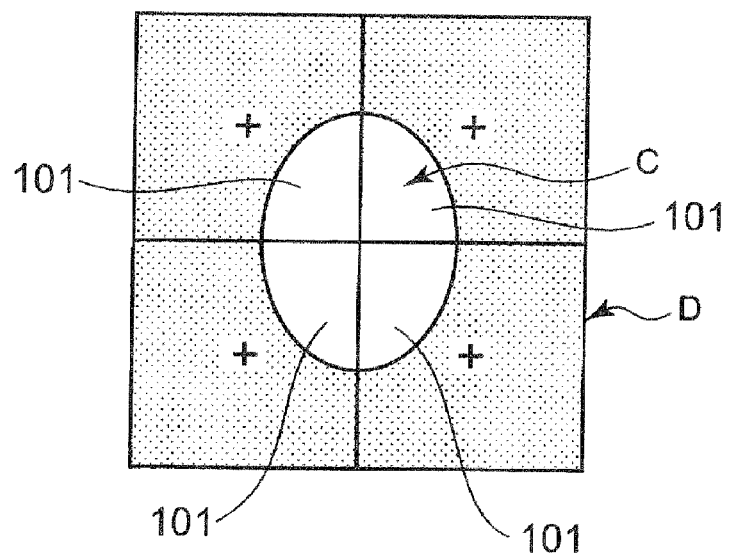

When the face portion C is bright and the background is dark as shown in FIG. 17B, the brightness level based on the average V value of the block region 101 belonging to the face block D is reduced if the brightness level adjustment is not performed. For this reason, the gain level of each pixel in the face block D is increased. As a result, the gain for the pixel of the face portion C is made excessive. However, it is possible to avoid the excess of the gain for the face portion C by limiting the brightness level as described above. Consequently, it is possible to eliminate a situation in which the face portion C is unnaturally brightened with the tone correction.

In other words, by limiting the brightness level of the block region 101 belonging to the face block D, it is also possible to perform the tone correction in which importance is attached to a face portion of a person in an image. As a result, it is possible to maintain a appropriate tone in the face portion of the person in the tone correction of the image.

In the embodiment, in the calculation of the gain for each pixel, the highlight determination is performed for the input image and it is determined whether the negative correction of the pixel value for the image in the bright portion is inappropriate for the input image or not. If the negative correction is inappropriate for the image, the lower limit of the gain to be set every pixel is clipped (limited) to "1.0". Consequently, it is possible to prevent a useless reduction in a contrast in the case in which the input image has a poor tone in the bright portion, and a generation of a tone jump in the case in which the input image has a large whiteout and the generation of the tone jump around a portion in which a color saturation is caused.

It is desirable to execute the face prioritized contrast enhancement and the adjustment of the brightness level of the block region 101 belonging to the face block D at the same time as in the embodiment. However, they do not always need to be executed at the same time and only one of them may be executed.

In the description, in the tone correction of the input image 100, the correction characteristic (gain function) is set every pixel and the brightness of the pixel is individually corrected in accordance with the correction characteristic thus set. However, a specific method of individually correcting the brightness of each pixel in the tone correcting apparatus 600 is not particularly limited but methods other than the method described above may be employed.

Also in the case in which the other method is employed, it is possible to perform the tone correction in which importance is attached to the face portion of the person in the image by individually correcting the brightness of each pixel based on the brightness information of each of the block regions 101 and that of the face portion C. Consequently, it is possible to maintain a appropriate tone in the face portion of the person.

In the embodiment, in the case in which the face having the predetermined size or more exists in the input image 100, the gain to be set to each pixel is calculated by using the limited gain function glim (Vin, lev, x) shown in FIG. 6A. By setting a value acquired based on the brightness level of each of the block regions 101 and that of the face block D to the parameter of the gain function glim (Vin, lev, x), there is performed the face prioritized contrast enhancement in which importance is attached to the tone of the face portion. However, the processing may be changed as follows, for example.

For example, by using the gain function g (Vin, lev, x) to be the basis shown in FIG. 5A, it is also possible to set, every pixel, the correction characteristic based on the brightness level of each of the block regions 101, to once calculate the gain of each pixel in accordance with the correction characteristic thus set and to correct the calculated gain based on the brightness level of the face block D. In addition, by previously determining the brightness level of each of the block regions 101 to be slightly higher based on the brightness level of the face block D, it is also possible to restrict the upper limit of the gain for each pixel as a result.

In the embodiment, the brightness level of the block region 101 belonging to the face block D in each of the block regions 101 is regulated depending on the difference between the brightness level of the face portion C and that of the face block D, and the typical correction characteristic is set to the center pixel of the block region 101 belonging to the face block D based on the brightness level after the adjustment to compensate for the excess and deficiency of the gain for the pixel of the face portion C. However, the processing may be changed as follows, for example.

For example, when setting the typical correction characteristic to the center pixels of the block regions 101 belonging to the face block D respectively without limiting the brightness level of the block region 101 as described above, it is also possible to set typical correction characteristics considering the difference between the brightness level of the face portion C and that of the face block D respectively differently from other general block regions 101.

Referring to the block region 101 belonging to the face block D, when determining the brightness level, it is also possible to consider a relative relationship in a brightness between the block region 101 and eight other block regions 101 which are adjacent to the surroundings thereof, and furthermore, to previously decide the brightness level in consideration of the difference between the brightness level of the face portion C and that of the face block D and to set the typical correction characteristic to the center pixel of the block region 101 belonging to the face block D based on the result of the determination in accordance with the same reference as that in the other block regions 101.

Furthermore, it is also possible to once determine the typical correction characteristic to be set to the center pixel of each of the block regions 101 corresponding to the brightness level of the block region 101 without limiting the brightness level of the block region 101 belonging to the face block D as described above, and to then change only the typical correction characteristic of the block region 101 belonging to the face block D into a correction characteristic considering the difference between the brightness level of the face portion C and that of the face block D.

Moreover, the typical correction characteristic to be set to the center pixel of the block region 101 belonging to the face block D may be directly determined based on a combination of the brightness level of the same block region 101 and a difference between the brightness level of the face portion C and that of the face block D.

In the embodiment, the input image 100 is divided into the block regions 101 and the brightness level (brightness information) is acquired for each of the block regions 101. However, the block region in which the brightness level is acquired does not always need to be obtained by dividing the input image 100 but may be set to be the block region and it is also possible to set the block regions in which the adjacent block regions partially overlap with each other.

In the embodiment, the average Y value is acquired as the brightness information of the face portion C and the brightness level of each of the block regions 101 belonging to the face block D is determined based on the average Y value. However, the average V value may be acquired as the brightness information of the face portion C and the brightness level of each of the block regions 101 may be determined based on the average V value. In that case, the face portion of the person generally takes a skin color having an R component in a large amount. Therefore, the average V value is larger than the average Y value. In other words, the brightness levels of the face portion C and the face block D are increased. For this reason, it is necessary to adjust the brightness level of each of the block regions 101 belonging to the face block D acquired finally in consideration of the foregoing or to calculate the gain limit coefficient (lim) in the face prioritized contrast enhancement.

While the brightness levels of the first and second key determining regions A and B are divided in the three levels including "Low", "Middle" and "High", the number of the levels of the brightness level to be determined may be two or four or more. In addition, the numbers of the levels of the brightness levels to be determined in the first and second key determining regions A and B may be different from each other.

In the case in which the numbers of the levels are set to be equal to each other in the same manner as in the embodiment, it is also possible to perform weighting over the result of the second key determination by changing criteria in the first key determination for the first key determining region A and the second key determination for the second key determining region B, that is, a relationship between the average V value and the brightness level, for example.

Although the brightness level of each of the block regions 101 which is to be determined in the third key determination, that is, the brightness to be the reference for determining the typical correction characteristic set to each of the center pixels is determined in the six levels including the "Low 1" to "High 2", the number of the levels may be changed. It is possible to perform the tone correction more precisely in a larger number of levels for the brightness level to be determined. For this reason, it is desirable that the number of the levels for the brightness level to be determined in the third key determination should be larger than that of the levels for the brightness level in the determination of the brightness in each of the first and second key determining regions A and B as in the embodiment.

While the brightness level of each of the block regions 101 is determined based on the V value of each pixel (more specifically, the average V value of each of the block regions), the same brightness level may be determined based on other brightness information such as a Y (brightness) value obtained from the R, G and B values of each pixel. In some cases in which the brightness information other than the V value is used, the color saturation cannot be determined in the highlight determination and an unnecessary gain is given to the color saturation portion. For this reason, it is desirable to use the V value for the brightness information.

In the embodiment, the second key determining region to be the target region for acquiring the second brightness level is set to be the region (the inclusive region) B constituted by the block region 101 (A in FIG. 2B) to be the focused region and eight other block regions 101 which are adjacent to the surroundings thereof (B1, B2, . . . , B8 in FIG. 2B). However, the target region for acquiring the second brightness level is not limited thereto in the invention. For example, only the eight other block regions which are adjacent to the surroundings of the focused region may be set to be the second key determining region or some of the eight other block regions which are adjacent to the surroundings of the focused region (B2, B4, B5 and B7 in FIG. 2B) may be set to be the second key determining region.

Furthermore, each component of the tone correcting apparatus 600 may be implemented by an ASIC (application specific integrated circuit). In addition, in the functions implemented by the tone correcting apparatus 600, the functions of a whole or part of the portions other than the input unit 601 and the output unit 617 may be implemented in accordance with a software program to be executed by a processor provided in a computer, an imaging apparatus or an image processing apparatus, for example. In the case in which the function to be implemented by the tone correcting apparatus 600 is to be implemented into the imaging apparatus such as a digital camera or a digital video camera, for example, it is also possible to run a tone correcting program for performing a tone correction processing shown in FIGS. 13, 15 and 16 through a processor included in a computer system provided in the apparatuses. The tone correcting program can be provided in a form of a recording medium, for example, a nonvolatile memory such as a mask ROM or an EPROM (Erasable Programmable ROM), a flash memory device, an optical disk or a magnetic disk. Moreover, the tone correcting program may be provided through a wired or wireless computer network.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A tone correcting apparatus for correcting a tone of an image, the apparatus comprising:
a first determination device that determines which one of previously defined first brightness levels a focused region corresponds to, the focused region being selected from among a plurality of block regions that are set to cover an entire area of the image;
a second determination device that determines which one of previously defined second brightness levels an adjacent block region corresponds to, the adjacent block region being at least one of the block regions that is adjacent to the focused region;
a correction device that corrects a brightness of pixels included in the focused region based on a combination of the first brightness level determined by the first determination device and the second brightness level determined by the second determination device;
a third determination device that determines which one of previously defined third brightness levels the combination of the first brightness level and the second brightness level corresponds to, the third brightness levels being previously defined to be more detailed than the first brightness level and the second brightness level, wherein the correction device corrects the brightness of the pixels included in the focused region based on the third brightness level determined by the third determination device;
a first characteristic setting device that sets a first correction characteristic for each of the block regions, the first correction characteristic being selected from among a plurality of correction characteristics in accordance with the third brightness level determined by the third determination device for the respective block regions; and
a second characteristic setting device that sets a second correction characteristic for the pixels included in the image, the second correction characteristic being derived from the first correction characteristic, wherein the correction device corrects the brightness of the pixels included in the image based on the second correction characteristic.

2. The apparatus according to claim 1 further comprising an acquiring device that acquires brightness information indicating brightness of each of the pixels included in the image, wherein the first determination device and the second determination device determine the first brightness level and the second brightness level based on the brightness information.

3. The apparatus according to claim 2, wherein the acquiring device acquires the brightness information in an HSV color space.

4. The apparatus according to claim 1, wherein the second characteristic setting device sets the first correction characteristic for a center pixel in each of the respective block regions and sets the second correction characteristic for the other pixels included in the image except the center pixel.

5. The apparatus according to claim 1, further comprising a calculation device that calculates, with a correction function, a correction coefficient for each of the pixels included in the focused region to be used by the correction device for correcting the brightness of the pixels, wherein the second characteristic setting device sets a variable of the correction function as the second correction characteristic.

6. The apparatus according to claim 5, further comprising:
a contrast determination device that determines a contrast status of the image; and
an upper limit adjusting device that adjusts an upper limit of the correction coefficient based on the contrast status determined by the contrast determination device.

7. The apparatus according to claim 6, wherein the contrast determination device determines the contrast status based on the number of the block regions having the third brightness level that is determined by the third determination device and belongs to a given level.

8. The apparatus according to claim 7, wherein the contrast determination device determines the contrast status based on a combination of the number of the block regions having the third brightness level that is determined by the third determination device and belongs to a given level.

9. The apparatus according to claim 5, further comprising:
a histogram acquiring device that acquires histogram information indicating a distribution status of the brightness of the image;
a distribution status determination device that determines whether the distribution status indicated by the histogram information matches a predetermined distribution status; and
a lower limit adjusting device that adjusts a lower limit of the correction coefficient when determined by the distribution status determination device that the distribution status indicated by the histogram information matches the predetermined distribution status.

10. The apparatus according to claim 9, wherein the histogram acquiring device acquires the histogram information in an HSV color space.

11. A method for correcting a tone of an image, the method comprising:
- determining which one of previously defined first brightness levels a focused region corresponds to, the focused region being selected from among a plurality of block regions that are set to cover an entire area of the image;
- determining which one of previously defined second brightness levels an adjacent block region corresponds to, the adjacent block region being at least one of the block regions that is adjacent to the focused region;
- correcting a brightness of pixels included in the focused region based on a combination of the determined first brightness level and the determined second brightness level;
- determining which one of previously defined third brightness levels the combination of the first brightness level and the second brightness level corresponds to, the third brightness levels being previously defined to be more detailed than the first brightness level and the second brightness level, wherein the correcting comprises correcting the brightness of the pixels included in the focused region based on the determined third brightness level;
- setting a first correction characteristic for each of the block regions, the first correction characteristic being selected from among a plurality of correction characteristics in accordance with the determined third brightness level for the respective block regions; and
- setting a second correction characteristic for the pixels included in the image, the second correction characteristic being derived from the first correction characteristic, wherein the correcting comprises correcting the brightness of the pixels included in the image based on the second correction characteristic.

12. A non-transitory computer-readable storage medium having stored thereon a program executable by a computer for correcting a tone of an image, the program being executable by the computer to perform processes comprising:
- determining which one of previously defined first brightness levels a focused region corresponds to, the focused region being selected from among a plurality of block regions that are set to cover an entire area of the image;
- determining which one of previously defined second brightness levels an adjacent block region corresponds to, the adjacent block region being at least one of the block regions that is adjacent to the focused region; and
- correcting a brightness of pixels included in the focused region based on a combination of the determined first brightness level and the determined second brightness level;
- determining which one of previously defined third brightness levels the combination of the first brightness level and the second brightness level corresponds to, the third brightness levels being previously defined to be more detailed than the first brightness level and the second brightness level, wherein the correcting comprises correcting the brightness of the pixels included in the focused region based on the determined third brightness level;
- setting a first correction characteristic for each of the block regions, the first correction characteristic being selected from among a plurality of correction characteristics in accordance with the determined third brightness level for the respective block regions; and
- setting a second correction characteristic for the pixels included in the image, the second correction characteristic being derived from the first correction characteristic, wherein the correcting comprises correcting the brightness of the pixels included in the image based on the second correction characteristic.

* * * * *